United States Patent
Maeda et al.

(10) Patent No.: US 11,802,086 B2
(45) Date of Patent: Oct. 31, 2023

(54) ANTI-FOULING COATING FILM, GLASS CERAMIC PRODUCT, COATING MATERIAL FOR FORMING ANTI-FOULING COATING FILM, AND METHOD FOR PRODUCING GLASS CERAMIC PRODUCT

(71) Applicant: SUMITOMO OSAKA CEMENT CO., LTD., Tok (JP)

(72) Inventors: Daisaku Maeda, Tokyo (JP); Keijiro Shigeru, Chiba (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 351 days.

(21) Appl. No.: 17/275,670

(22) PCT Filed: Sep. 5, 2019

(86) PCT No.: PCT/JP2019/035011
§ 371 (c)(1),
(2) Date: Dec. 8, 2021

(87) PCT Pub. No.: WO2020/054577
PCT Pub. Date: Mar. 19, 2020

(65) Prior Publication Data
US 2022/0220037 A1    Jul. 14, 2022

(30) Foreign Application Priority Data
Sep. 13, 2018  (JP) .................. 2018-171189

(51) Int. Cl.
*C04B 35/48* (2006.01)
*C03C 10/00* (2006.01)
*C03C 17/25* (2006.01)
*C04B 35/622* (2006.01)
*C04B 35/64* (2006.01)

(52) U.S. Cl.
CPC ............ *C04B 35/481* (2013.01); *C03C 10/00* (2013.01); *C03C 17/25* (2013.01); *C04B 35/62222* (2013.01); *C04B 35/64* (2013.01); *C03C 2217/213* (2013.01); *C03C 2217/22* (2013.01); *C03C 2217/228* (2013.01); *C03C 2217/23* (2013.01); *C03C 2217/70* (2013.01); *C03C 2218/112* (2013.01); *C03C 2218/119* (2013.01); *C03C 2218/32* (2013.01); *C04B 2235/3227* (2013.01); *C04B 2235/3244* (2013.01); *C04B 2235/3409* (2013.01); *C04B 2235/3418* (2013.01); *C04B 2235/6567* (2013.01)

(58) Field of Classification Search
None
See application file for complete search history.

(56) References Cited

U.S. PATENT DOCUMENTS

| | | | |
|---|---|---|---|
| 8,715,405 B2 | 5/2014 | Le Blanc et al. | |
| 2010/0080984 A1* | 4/2010 | Lee ........................ | C04B 41/009 427/419.4 |
| 2010/0101429 A1* | 4/2010 | Shigeru ............... | C23C 18/1295 427/372.2 |
| 2018/0194694 A1* | 7/2018 | Kirby .................... | C04B 41/522 |
| 2021/0009468 A1* | 1/2021 | Kim .......................... | C03C 8/08 |

FOREIGN PATENT DOCUMENTS

| | | | |
|---|---|---|---|
| CN | 101184866 | 5/2008 | |
| JP | 2009083131 A * | 4/2009 | ............. A47J 36/02 |
| JP | 2011011958 A * | 1/2011 | |
| JP | 5403094 | 1/2014 | |

OTHER PUBLICATIONS

"International Search Report (Form PCT/ISA/210) of PCT/JP2019/035011," dated Oct. 8, 2019, with English translation thereof, pp. 1-4.

* cited by examiner

*Primary Examiner* — David Sample
(74) *Attorney, Agent, or Firm* — JCIPRNET

(57) ABSTRACT

An anti-fouling coating film of the present invention includes a component (A): zirconium; a component (B): lanthanum; and a component (C): at least one selected from the group consisting of silicon, phosphorus, and boron, in which in a case where masses of the component (A), the component (B), and the component (C) are used by being converted into masses of oxides thereof, total mass of the component (A) and the component (B) with respect to a mass of the anti-fouling coating film is 90% or more and 95% or less, and in a case where X is defined by X=mass of component (B)/(total mass of component (A)+component (B))×100, X is 20% or more and 50% or less, and the mass of the component (C) to the mass of the anti-fouling coating film is 5% or more and [6+(X−20)/6]% or less.

5 Claims, No Drawings

ANTI-FOULING COATING FILM, GLASS CERAMIC PRODUCT, COATING MATERIAL FOR FORMING ANTI-FOULING COATING FILM, AND METHOD FOR PRODUCING GLASS CERAMIC PRODUCT

CROSS-REFERENCE TO RELATED APPLICATION

This application is a 371 application of the international PCT application serial no. PCT/JP2019/035011, filed on Sep. 5, 2019, which claims the priority benefits of Japan application no. 2018-171189, filed on Sep. 13, 2018. The entirety of each of the above-mentioned patent applications is hereby incorporated by reference herein and made a part of this specification.

TECHNICAL FIELD

The present invention relates to an anti-fouling coating film, a glass ceramic product, a coating material for forming an anti-fouling coating film, and a method for producing a glass ceramic product.

BACKGROUND ART

A glass ceramic product has properties excellent in heat resistance, design, high surface hardness, and the like, and is thus widely used as a top plate for a gas stove, an induction heater, and a radiant heater product. However, the glass ceramic product has a defect that cleaning becomes difficult when a substance such as food and the like is scorched at a high temperature. In order to make up for such a defect in cleanability, it has been studied to form an anti-fouling coating film formed of a fluororesin or an inorganic material on a surface of a glass substrate configuring a glass ceramic product.

However, in the related art, the anti-fouling coating film formed on the surface of the glass substrate has the following defects.

A glass ceramic product in which an anti-fouling coating film formed of a fluororesin is formed on the surface of the glass substrate have a defect that the product easily deteriorates under a temperature condition exceeding 300° C. or an abrasion condition.

As an anti-fouling coating film formed of an inorganic material, for example, an anti-fouling coating film formed of a silicon oxide and a zirconia oxide is known (see, for example, Patent Literature No. 1).

However, the anti-fouling coating film of Patent Literature No. 1 has problems that a cleanability against a scorched food containing sugar and when contaminants containing an acid or an alkali are scorched on a surface of the anti-fouling coating film at a high temperature, the anti-fouling coating film is eroded to change an appearance. On the other hand, regarding the appearance, in particular, in a thick anti-fouling coating film in which a difference between a visual reflectance of the surface of the anti-fouling coating film and a visual reflectance of a surface of a glass substrate having no anti-fouling coating film is 1% or more, the change in an interference color of the anti-fouling coating film due to the erosion becomes noticeable. Therefore, a film thickness of the anti-fouling coating film is required to be reduced. However, reducing the film thickness of the anti-fouling coating film is disadvantageous not only in limiting a design of a product but also in terms of deteriorating a function of the anti-fouling coating film.

Examples of the deterioration in the function of the anti-fouling coating film when a film thickness of the anti-fouling coating film is reduced include: (1) a case where an abrasion resistance of a film or cleanability deteriorates; (2) a case where when a coating material for forming an anti-fouling coating film is thinly applied onto a surface of a glass substrate to form a coating film and a drying temperature for the coating film is raised to, for example, 850° C. or higher, the anti-fouling coating film sinks into the glass substrate due to a solid-phase reaction between components of the anti-fouling coating film and the glass substrate and softening of the glass and as a result an abrasion resistance or a cleanability deteriorates to increase process restrictions; and the like.

REFERENCE LIST

Patent Literature

Patent Literature No. 1: Japanese Patent No. 5403094

SUMMARY

Technical Problem

The present invention has been made in view of the circumstances, and an object thereof is to provide an anti-fouling coating film, a glass ceramic product, a coating material for forming an anti-fouling coating film, and a method for producing a glass ceramic product, by which it is easy to clean scorched contaminants containing a sugar, durability against erosion of an acid or an alkali contained in contaminants can be improved, and a mechanical strength such as abrasion resistance and the like can be improved without impairing a cleanability and a chemical durability (durability against an acid or an alkali).

Solution to Problem

As a result of intensive studies to solve the above problems, the present inventors have found that an anti-fouling coating film capable of improving the above problems is obtained by forming an anti-fouling coating film having features to be described below, and completed the present invention.

That is, an anti-fouling coating film according to a first aspect of the present invention includes a component (A): zirconium; a component (B): lanthanum; and a component (C): at least one selected from the group consisting of silicon, phosphorus, and boron, in which in a case where masses of the component (A), the component (B), and the component (C) are used by being converted into masses of oxides, a proportion of a total mass of the component (A) and the component (B) to a mass of the anti-fouling coating film is 90% or more and 95% or less, and in a case where a proportion X is defined by a formula, X=mass of component (B)/(total mass of component (A)+component (B))×100, X is 20% or more and 50% or less, and a proportion of the mass of the component (C) to the mass of the anti-fouling coating film is 5% or more and [6+(X−20)/6]% or less.

A glass ceramic product according to a second aspect of the present invention includes: a substrate; and the anti-fouling coating film according to the first aspect of the present invention formed on a surface of the substrate.

In the glass ceramic product, it is preferable that a difference ($R_1$−$R_2$) between a visual reflectance $R_1$% of a surface of the anti-fouling coating film and a visual reflectance $R_2\%$ of a surface of the substrate is 1% or more.

A coating material for forming an anti-fouling coating film according to a third aspect of the present invention includes: a component (a): at least one selected from the group consisting of a zirconium oxide, a zirconium ion, and a zirconium oxide precursor; a component (b): at least one selected from the group consisting of a lanthanum oxide, a lanthanum ion, and a lanthanum oxide precursor; a component (c): at least one selected from the group consisting of an oxide, an ion, and an oxide precursor of at least one of silicon, phosphorus, and boron; and a dispersion medium, in which in a case where masses of the component (A), the component (B), and the component (C) are used by being converted into masses of oxides, a proportion of a total mass of the component (a) and the component (b) to a mass of a total solid content of the coating material is 90% or more and 95% or less, and in a case where a proportion X is defined by a formula, X=mass of component (B)/(total mass of component (A)+component (B))×100, X is 20% or more and 50% or less, and a proportion of the mass of the component (c) to the mass of the total solid content is 5% or more and [6+(X−20)/6]% or less.

A method for producing a glass ceramic product according to a fourth aspect of the present invention includes: a step of applying a coating material for forming an anti-fouling coating film of the present invention onto a surface of a substrate; and a step of heat-treating the coating film at a temperature of 650° C. or higher and 950° C. or lower to form an anti-fouling coating film on the surface of the substrate.

Advantageous Effects of Invention

According to the present invention, it is possible to provide an anti-fouling coating film, a glass ceramic product, a coating material for forming an anti-fouling coating film, and a method for producing a glass ceramic product, by which it is easy to clean scorched contaminants containing a sugar, durability against erosion of an acid or an alkali contained in contaminants can be improved, and a mechanical strength such as abrasion resistance and the like can be improved without impairing a cleanability and a chemical durability (durability against an acid or an alkali).

DESCRIPTION OF THE EMBODIMENTS

Embodiments of an anti-fouling coating film, a glass ceramic product, a coating material for forming an anti-fouling coating film, and a method for producing a glass ceramic product of the present invention will be described.

The present embodiment is specifically described in order to better understand the gist of the invention, and does not limit the present invention unless otherwise specified.

A kind, an amount, a proportion, time, and the like can be changed, omitted, added, replaced, or otherwise changed within a range not departing from the gist of the present invention. In each embodiment, preferable examples may be shared with each other.

[Anti-Fouling Coating Film]

An anti-fouling coating film of the present embodiment has the following features. That is, the anti-fouling coating film includes a component (A): zirconium, a component (B): lanthanum, and a component (C): at least one selected from the group consisting of silicon, phosphorus, and boron. In a case where masses of the component (A), the component (B), and the component (C) are converted into masses of oxides thereof, a proportion of a total mass of the component (A) and the component (B) to a mass of the anti-fouling coating film is 90% or more and 95% or less. A proportion X defined by a formula, X=mass of component (B)/(total mass of component (A)+component (B))×100 is 20% or more and 50% or less. A proportion of the mass of the component (C) to the mass of the anti-fouling coating film is 5% or more and [6+(X−20)/6]% or less.

In the following description, the components (A) to (C) may be described as (A) zirconium, (B) lanthanum, and (C) silicon, respectively.

The anti-fouling coating film of the present embodiment is preferably provided on a discretionally selected region of a discretionally selected substrate, for example, at least a part of the surface of the substrate, that is, a region where there is a possibility of scorched stains or oil stains of food and the like.

Here, examples of the substrate to which the anti-fouling coating film of the present embodiment is applied include, as a product, cooking items such as a top plate of a gas stove, an induction heating (IH) type IH stove, a radiant stove, and the like, an oven plate of an oven, an oven housing, and an oven bottom plate.

Examples of other substrates include a glaze-treated product having a glaze-treated surface, transparent or black glass ceramics, and the like.

Examples of the glaze-treated product include a top plate of various stoves, an oven plate made of enamel, an oven housing, an oven plate made of ceramics or porcelain, an oven bottom plate, and the like.

Examples of a transparent or black crystallized glass include crystallized glass for the top plate of the gas stove, the top plate of the IH stove, and the top plate of the radiant stove. Here, the transparent glass also includes a glass colored on a back surface of the transparent crystallized glass.

However, the anti-fouling coating film of the present embodiment can be applied to various fields other than the above.

The anti-fouling coating film of the present embodiment includes the (A) zirconium, the (B) lanthanum, and the (C) at least one selected from the group consisting of silicon, phosphorus, and boron.

Component (A): the zirconium as the component (A) in the anti-fouling coating film may be a single zirconium element, may be a zirconium oxide ($ZrO_2$), or may be a mixture of the single zirconium element and the zirconium oxide. That is, the component (A) preferably includes at least one of the single zirconium element and the zirconium oxide.

Component (B): the lanthanum as the component (B) in the anti-fouling coating film may be a single lanthanum element, may be a lanthanum oxide ($La_2O_3$), or may be a mixture of the single lanthanum element and the lanthanum oxide. That is, the component (B) preferably includes at least one of the single lanthanum element and the lanthanum oxide.

Component (C): the silicon as the component (C) in the anti-fouling coating film may be a single silicon element, may be a silicon oxide ($SiO_2$), or may be a mixture of the single silicon element and the silicon oxide.

Component (C): the phosphorus as the component (C) in the anti-fouling coating film may be a single phosphorus element, may be a phosphorus oxide (phosphorus pentoxide: $P_2O_5$), or may be a mixture of the single phosphorus element and the phosphorus oxide.

Component (C): the boron as the component (C) in the anti-fouling coating film may be a single boron element, may be a boron oxide (boron oxide: $B_2O_3$), or may be a mixture of the single boron element and the boron oxide.

That is, the component (C) preferably includes at least one of the single silicon element, the silicon oxide, the single phosphorus element, the phosphorus oxide, the single boron element, and the boron oxide.

In the anti-fouling coating film of the present embodiment, In a case where masses of the component (A), the component (B), and the component (C) are converted into masses of oxides thereof, the total mass of the component (A) and the component (B) with respect to the mass (entire mass) of the anti-fouling coating film is 90% or more and 95% or less, and preferably 92.5% or more and 95% or less, and also preferably 93.0% or more and 95.0% or less.

In a case where the total mass of the component (A) and the component (B) with respect to the mass (entire mass) of the anti-fouling coating film is 90% or more, a cleanability of the anti-fouling coating film and a chemical durability against an acid or an alkali do not deteriorate. On the other hand, in a case where the total mass of the component (A) and the component (B) with respect to the mass (entire mass) of the anti-fouling coating film does not exceed 95%, an abrasion resistance of the anti-fouling coating film does not deteriorate.

Converting into the mass of oxides may mean obtaining a value of the mass by a discretionally selected measurement, assuming that at least one of the silicon, the phosphorus, and the boron, the zirconium, and the lanthanum which are contained in a material used for forming the anti-fouling coating film are all oxides.

The mass (entire mass) of the anti-fouling coating film may mean a value of the sum of the mass of the component (A) converted as the oxide, the mass of the component (B) converted as the oxide, and the mass of the component (C) converted as the oxide.

In the anti-fouling coating film of the present embodiment, in a case where the masses of the component (A), the component (B), and the component (C) are converted into the masses of oxides, a proportion X defined by a formula, X=mass of component (B)/(total mass of component (A)+ component (B))×100 is 20% or more and 50% or less, preferably 25% or more and 45% or less, and more preferably 30% or more and 40% or less.

In a case where the X is 20% or more, the chemical durability (durability against an acid or an alkali) of the anti-fouling coating film does not deteriorate. In a case where the anti-fouling coating film is applied to a glass ceramic product, in an anti-fouling coating film to be described later in which a difference ($R_1$–$R_2$) between a visual reflectance $R_1$% of a surface of the anti-fouling coating film and a visual reflectance $R_2$% of a surface of the glass ceramic substrate is 1% or more, even after removing a scorched substance containing an acid or an alkali such as tomato ketchup or jam, a change in an appearance of the anti-fouling coating film does not increase. On the other hand, in a case where the X does not exceed 50%, in a case where the anti-fouling coating film is applied to the glass ceramic product, an adhesion of the anti-fouling coating film to the glass ceramic substrate does not deteriorate.

In the anti-fouling coating film of the present embodiment, in a case where the masses of the component (A), the component (B), and the component (C) are converted into the masses of oxides, a proportion of the mass of the component (C) to the mass (entire mass) of the anti-fouling coating film is 5% or more and [6+(X−20)/6]% or less.

In a case where the proportion is 5% or more, an abrasion resistance of the anti-fouling coating film does not deteriorate. On the other hand, in a case where the proportion does not exceed [6+(X−20)/6]%, the cleanability of the anti-fouling coating film does not deteriorate. Also, since the chemical durability (durability against an acid or an alkali) of the anti-fouling coating film does not also deteriorate, in a case where the anti-fouling coating film is applied to a glass ceramic product, in an anti-fouling coating film to be described later in which a difference ($R_1$–$R_2$) between a visual reflectance $R_1$% of a surface of the anti-fouling coating film and a visual reflectance $R_2$% of the surface of the glass ceramic substrate is 1% or more, even after removing a scorched substance containing an acid or an alkali such as tomato ketchup or jam, a change in an appearance of the anti-fouling coating film does not increase.

In the anti-fouling coating film of the present embodiment, in a case where the masses of the component (A), the component (B), and the component (C) are converted into the masses of oxides, a proportion of the mass of the component (C) to the mass (entire mass) of the anti-fouling coating film can be discretionally selected within the above range. For example, the proportion may be 5.0% to 11.0%, preferably 5.5% to 10.0%, more preferably 6.0% to 9.5%, and still more preferably 6.5% to 8.6%. However, the proportion is not limited to these examples.

Examples of a method for measuring the masses of the component (A), the component (B) and the component (C) contained in the anti-fouling coating film as masses of the above oxides include a fluorescent X-ray method or a method using an electron probe microanalyzer.

For example, the converted mass of the component (A) may be a value measured as a mass of $ZrO_2$ by a quantitative analysis of the anti-fouling coating film by the fluorescent X-ray method. The mass of the component (B) may be a value measured as a mass of $La_2O_3$ in the same manner as above, and the mass of the component (C) may be a value measured as a mass of at least one of $SiO_2$, $P_2O_5$, and $B_2O_3$ in the same manner as above.

The anti-fouling coating film of the present embodiment is formed by heating, and thus, preferably does not include a dispersion medium such as a solvent. The anti-fouling coating film of the present embodiment may be formed only of the component (A), the component (B), and the component (C).

The anti-fouling coating film of the present embodiment may contain a component (D) in addition to the component (A), the component (B), and the component (C), for example, a substance caused by a binder or a surfactant, in a predetermined amount, for example, a small amount. A proportion of the component (D) to a total amount of the components (A) to (C) of the anti-fouling coating film (a single element, an oxide, and a mixture are also calculated as each component) and the component (D) may be, for example, 0% to 10% by mass, 0.01% to 8.0% by mass, or 0.1% to 6.0% by mass. The proportion may be 0.5% to 4.0% by mass or 1.0% to 2.0% by mass.

The proportion of the components (A) to (C) to the total amount including the component (D) can be discretionally selected. For example, the proportion may be 90.0% to 100% by mass, and may also be 93.0% to 99.9% by mass. The proportion may also be 95.0% to 99.7% by mass, 97.0% to 99.5% by mass, or 98.0% to 99.0% by mass. However, the proportion is not limited to these examples.

A thickness of the anti-fouling coating film of the present embodiment can be discretionally selected, and may be, for example, 1 nm or more and 1 mm or less, preferably 10 nm or more and 200 nm or less, more preferably 15 nm or more and 150 nm or less, and still more preferably 20 nm or more and 120 nm or less.

When the thickness of the anti-fouling coating film is 10 nm or more, sufficient anti-fouling property can be imparted to the substrate on which an anti-fouling coating film is provided. On the other hand, when the thickness of the anti-fouling coating film is 200 nm or less, the anti-fouling coating film has sufficient impact resistance, and therefore a crack is less likely to occur due to an external force. Furthermore, since a glossiness of the anti-fouling coating film can be suppressed, a design property such as the color tone or the like of the substrate itself on which the anti-fouling coating film is provided is not impaired.

Examples of a method for measuring the thickness of the anti-fouling coating film of the present embodiment can be discretionally selected, and examples thereof include a method of observing a cross section of the anti-fouling coating film with a transmission electron microscope (TEM) and an optical film thickness measurement method.

A preferable example of a method for producing the anti-fouling coating film of the present embodiment will be described.

In the anti-fouling coating film of the present embodiment, a coating material for forming an anti-fouling coating film to be described later is applied to a discretionally selected substrate, for example, at least a part of the surface of the substrate, for example, a region where there is a possibility of scorched stains or oil stains of a substance such as a food and the like and is dried as needed to form a coating film. Moreover, the film can be obtained by heat-treating the coating film.

As a method for applying the coating material for forming an anti-fouling coating film, for example, a spray coating method, a bar coating method, a spin coating method, a dip coating method, a roll coating method, a screen printing method, and the like are used.

A condition for the heat treatment can be discretionally selected, and for example, a heating temperature is preferably a temperature of 650° C. or higher and 950° C. or lower, more preferably 700° C. or higher and 900° C. or lower, and still more preferably 800° C. or higher and 900° C. or lower. However, the condition is not limited to these conditions. A thickness of the obtained coating film can be discretionally selected, and is, for example, preferably 10 nm or more and 200 nm or less, more preferably 15 nm or more and 150 nm or less, and still more preferably 20 nm or more and 120 nm or less. A heating atmosphere can be discretionally selected, and for example, heating may be performed in an air atmosphere.

According to the anti-fouling coating film of the present embodiment, it is possible to improve the cleanability against scorch to the anti-fouling coating film, in particular, against the scorched contaminant containing a sugar which is difficult to remove in an inorganic anti-fouling coating film of the related art.

In addition, according to the anti-fouling coating film of the present embodiment, the durability against an acid or an alkali can be improved as compared with the inorganic anti-fouling coating film of the related art. Accordingly, the anti-fouling coating film becomes difficult to be eroded by a contaminant. Therefore, even in the anti-fouling coating film to be described later in which the difference ($R_1-R_2$) between the visual reflectance $R_1$% of the surface of the anti-fouling coating film and the visual reflectance $R_2$% of the surface of the glass ceramic substrate is 1% or more, for example, even in an anti-fouling coating film having a relatively large film thickness, a change in an appearance due to a change in an interference color of the anti-fouling coating film after scorch removal is difficult to occur. As a result, a range of choices for a product design is expanded. In addition, it is possible to improve the cleanability and the abrasion resistance by increasing the film thickness of the anti-fouling coating film, as compared with the anti-fouling coating film having a thin film thickness. Moreover, deterioration in a function of the anti-fouling coating film can be suppressed by calcination at a high temperature at 850° C. or higher.

Furthermore, according to the anti-fouling coating film of the present embodiment, the abrasion resistance can be improved while maintaining the cleanability or the durability against an acid or an alkali.

[Glass Ceramic Product]

A glass ceramic product of the present embodiment includes a substrate formed of a glass-ceramic and the anti-fouling coating film of the present embodiment formed on the surface of the substrate.

Examples of the glass ceramic product of the present embodiment include cooking items such as a top plate of a gas stove, an induction heating (IH) type IH stove, a radiant stove, and the like, an oven plate of an oven, an oven housing, and an oven bottom plate. However, the glass ceramic product is not limited to these examples. Any glass ceramic product can be applied as long as there is a possibility of stains.

In the glass ceramic product of the present embodiment, the difference ($R_1-R_2$) between the visual reflectance $R_1$% of the surface of the anti-fouling coating film provided on the substrate and the visual reflectance $R_2$% of the surface of the substrate is preferably 1% or more, and preferably 3% or more and 20% or less.

When the difference ($R_1-R_2$) is 1% or more, it is possible to improve the cleanability or the abrasion resistance, and deterioration in a function of the anti-fouling coating film can be suppressed by calcination at a high temperature at 850° C. or higher.

In the glass ceramic product of the present embodiment, examples of a method for measuring the visual reflectance ($R_1$)% of the surface of the anti-fouling coating film and the visual reflectance ($R_2$)% of the surface of the substrate include a method described in Japanese Industrial Standards JIS Z 8722: 2009 "Color measurement method-reflection and transmission object color".

Examples of the substrate include the same substrate formed of glass ceramic as those mentioned as the example of the substrate used in the anti-fouling coating film of the present embodiment.

The thickness of the substrate is not particularly limited, and is appropriately adjusted according to a kind of the glass ceramic product, the place (position) to be applied, and the like.

The glass ceramic product of the present embodiment includes the anti-fouling coating film of the present embodiment. Therefore, it is possible to improve the cleanability against scorch to the anti-fouling coating film, in particular, against the scorched contaminant containing a sugar which is difficult to remove in an inorganic anti-fouling coating film of the related art. In addition, according to the glass ceramic product of the present embodiment, the durability of the anti-fouling coating film against an acid or an alkali can be improved as compared with the inorganic anti-fouling coating film of the related art. Furthermore, according to the glass ceramic product of the present embodiment, the abrasion resistance of the anti-fouling coating film can be improved while maintaining the cleanability or the durability against an acid or an alkali.

[Coating Material for Forming an Anti-Fouling Coating Film]

The coating material for forming an anti-fouling coating film according to the present embodiment includes: a component (a): at least one selected from the group consisting of a zirconium oxide, a zirconium ion, and a zirconium oxide precursor; a component (b): at least one selected from the group consisting of a lanthanum oxide, a lanthanum ion, and a lanthanum oxide precursor; a component (c): at least one selected from the group consisting of an oxide, an ion, and an oxide precursor of at least one of silicon, phosphorus, and boron; and a dispersion medium. In a case where the masses of the component (a), the component (b) and the component (c) are converted into the masses as the oxides, the proportion of the total mass of the component (a) and the component (b) to the mass of the total solid content is 90% or more and 95% or less, the proportion X defined by a formula, X=mass of component (b)/(total mass of component (a)+component (b))×100 is 20% or more and 50% or less, and a proportion of the mass of the component (c) to the mass of the total solid content is 5% or more and [6+(X−20)/6]% or less.

The coating material for forming an anti-fouling coating film of the present embodiment is used for forming the anti-fouling coating film of the present embodiment.

In the coating material for forming an anti-fouling coating film of the present embodiment, the zirconium oxide is a zirconium oxide ($ZrO_2$). Ions of the zirconium oxide are at least one selected from $Zr^{2+}$, $Zr^{3+}$, $Zr^{4+}$, $ZrO^+$, $ZrO^{2+}$, $Zr_2O^{4+}$, and $Zr_2O_2^{2+}$. The zirconium oxide precursor is one selected from zirconium nitrate, zirconium oxynitrate, zirconium acetate, zirconium oxychloride, zirconium sulfate, zirconium hydroxide, zirconium methoxide, zirconium ethoxide, zirconium propoxide, and zirconium butoxide.

In the coating material for forming an anti-fouling coating film of the present embodiment, the lanthanum oxide is a lanthanum oxide ($La_2O_3$). An ion of the lanthanum oxide is at least one selected from $La^{3+}$, $LaO^+$, $LaO_2^-$, $La_2O^{4+}$, and $La_2O_2^{2+}$. The lanthanum oxide precursor is at least one selected from lanthanum nitrate, lanthanum oxynitrate, lanthanum acetate, lanthanum oxychloride, lanthanum sulfate, lanthanum hydroxide, lanthanum methoxide, lanthanum ethoxide, lanthanum propoxide, and lanthanum butoxide.

In the coating material for forming an anti-fouling coating film of the present embodiment, the silicon oxide is a silicon oxide ($SiO_2$). An ion of the silicon oxide is at least one selected from $Si^{4+}$ and $SiO^{2+}$. The silicon oxide precursor is at least one selected from sodium silicate, lithium silicate, potassium silicate, tetramethoxysilane, tetraethoxysilane, tetrapropoxysilane, and tetrabutoxysilane.

In the coating material for forming an anti-fouling coating film of the present embodiment, the phosphorus oxide is a phosphorus pentoxide ($P_2O_5$). An ion of the phosphorus oxide is at least one selected from $P^{5+}$, $PO^{3+}$, $PO_2^+$, $PO_3^-$, $PO_4^{3-}$, $P_2O^{8+}$, $P_2O_2^{6+}$, $P_2O_3^{4+}$, and $P_2O_4^{2+}$. The phosphorus oxide precursor is at least one selected from a phosphoric acid and triphenyl phosphoric acid.

In the coating material for forming an anti-fouling coating film of the present embodiment, the boron oxide is a boron oxide ($B_2O_3$). An ion of the boron oxide is at least one selected from $B^{3+}$, $BO^+$, $BO^{2-}$, $B_2C^{4+}$, and $B_2O_2^{2+}$. The boron oxide precursor is at least one selected from a boric acid, boron trichloride, and boron hydroxide.

In the anti-fouling coating film of the present embodiment, in a case where the masses of the component (a), the component (b), and the component (c) are converted into the masses of oxides, the proportion of the total mass of the component (a) and the component (b) with respect to the mass of the total solid content (total mass of the component (a), the component (b), and the component (c)) of the coating material for forming an anti-fouling coating film is 90% or more and 95% or less, and preferably 92.5% or more and 95% or less, and also preferably 93.0% or more and 95.0% or less.

In a case where the total mass of the component (a) and the component (b) with respect to the mass of the total solid content of the coating material for forming an anti-fouling coating film is 90% or more, the cleanability of the anti-fouling coating film and a chemical durability against an acid or an alkali do not deteriorate. On the other hand, in a case where the total mass of the component (a) and the component (b) with respect to the mass of the total solid content of the coating material for forming an anti-fouling coating film does not exceed 95%, the abrasion resistance of the anti-fouling coating film does not deteriorate.

In the coating material for forming an anti-fouling coating film of the present embodiment, in a case where the masses of the component (a), the component (b), and the component (c) are converted into the masses of oxides, in a case where a proportion X is defined by a formula, X=mass of component (b)/(total mass of component (a)+component (b))×100, the X is 20% or more and 50% or less, preferably 25% or more and 45% or less, and more preferably 30% or more and 40% or less.

In a case where the X is 20% or more, the chemical durability (durability against an acid or an alkali) of the anti-fouling coating film formed by using the coating material for forming an anti-fouling coating film does not deteriorate. Also, in a case where the anti-fouling coating film is applied to a glass ceramic product, even in an anti-fouling coating film in which a difference ($R_1-R_2$) between a visual reflectance $R_1$% of a surface of the anti-fouling coating film and a visual reflectance $R_2$% of the surface of the glass ceramic substrate is 1% or more, a change in an appearance of the anti-fouling coating film after removing a scorched substance containing an acid or an alkali such as tomato ketchup or jam does not increase. On the other hand, in a case where the X does not exceed 50%, in a case where the anti-fouling coating film formed by using the coating material for forming an anti-fouling coating film is applied to the glass ceramic product, an adhesion of the anti-fouling coating film to the glass ceramic substrate does not deteriorate.

In the coating material for forming an anti-fouling coating film of the present embodiment, in a case where the masses of the component (a), the component (b), and the component (c) are converted into the masses of oxides, a proportion of the mass of the component (c) to the mass of the total solid content of the coating material for forming an anti-fouling coating film is 5% or more and [6+(X−20)/6]% or less.

In a case where the mass of the component (c) with respect to the mass of the total solid content of the coating material for forming an anti-fouling coating film is 5% or more, the abrasion resistance of the anti-fouling coating film formed by using the coating material for forming an anti-fouling coating film does not deteriorate. On the other hand, in a case where the proportion of the mass of the component (c) to the mass of the total solid content of the coating material for forming an anti-fouling coating film does not exceed [6+(X−20)/6]%, the cleanability of the anti-fouling coating film formed by using the coating material for forming an anti-fouling coating film does not deteriorate. In addition, the chemical durability of the anti-fouling coating film (durability against an acid or an alkali) does not deteriorate. Therefore, in a case where the anti-fouling coating film is applied to a glass ceramic product, in an anti-fouling coating film in which a difference ($R_1-R_2$) between a visual reflectance $R_1$% of a surface of the anti-fouling coating film and a visual reflectance $R_2$% of the surface of the glass ceramic substrate is 1% or more, a change in an appearance of the anti-fouling coating film after removing a scorched substance containing an acid or an alkali such as tomato ketchup or jam does not increase.

Examples of a method for measuring the masses of the component (a), the component (b) and the component (c) contained in the coating material for forming an anti-fouling coating film include a fluorescent X-ray method and an ICP emission spectrometry method.

In the coating material for forming an anti-fouling coating film of the present embodiment, the content of the total solid content (the component (a), the component (b), and the component (c)) in the coating material can be discretionally selected, and is preferably 0.2% by mass or more and 5.0% by mass or less, more preferably 0.25% by mass or more and 4.5% by mass or less, and still more preferably 0.3% by mass or more and 3.0% by mass or less.

In a case where the content of the total solid content (the component (a), the component (b), and the component (c)) is 0.2% by mass or more, a viscosity stability of the coating material does not deteriorate, the thickness of the anti-fouling coating film is not too small, and the cleanability, the chemical durability against an acid or an alkali, and the abrasion resistance do not deteriorate. On the other hand, in a case where the content of the total solid content (the component (a), the component (b), and the component (c)) does not exceed 5% by mass, the thickness of the anti-fouling coating film does not become excessive, and uneven appearance or peeling due to insufficient adhesion are unlikely to occur.

As the dispersion medium, any solvent capable of dissolving or dispersing the component (a), the component (b), and component (c) can be used without particular limitation. Examples of such a solvent include ethers (cellosolves) such as ethylene glycol monomethyl ether (methyl cellosolve), ethylene glycol monoethyl ether (ethyl cellosolve), ethylene glycol monobutyl ether (butyl cellosolve), propylene glycol monobutyl ether, and the like, ketones such as acetone, dimethyl ketone, diethyl ketone, methyl ethyl ketone, and the like, glycols such as ethylene glycol, and dimethyl sulfoxide, and the like, in addition to water and lower alcohols such as methanol, ethanol, 2-propanol, 1-butanol, and the like. One of these solvents may be used alone, or two or more kinds thereof may be used in combination. The amount of the dispersion medium can be discretionally selected, and, for example, may be, with respect to the coating material, 95.0% to 99.8% by mass, and is preferably 97% to 99.7% by mass, and more preferably 96.0% to 99.0% by mass. However, the amount is not limited to these examples.

The coating material for forming an anti-fouling coating film of the present embodiment may contain a surfactant, a binder, and the like to the extent that the anti-fouling property is not impaired.

The surfactant can be discretionally selected as long as the component (a), the component (b), and the component (c) can be dispersed in the dispersion medium, and is not particularly limited. The amount of surfactant can be discretionally selected.

The binder can be discretionally selected, for example, ethyl cellulose, hydroxyethyl cellulose, carboxymethyl cellulose, hydroxypropyl cellulose, hydroxypropylmethyl cellulose, methyl cellulose, hydroxyethyl methyl cellulose, guar gum, carrageenan, sodium alginate, corn starch, xanthan gum, polyacrylic acid, polyvinylpyrrolidone, polyvinyl alcohol, a carboxylvinyl polymer, sodium hyaluronate, sodium chondroitin sulfate, and the like. The amount of the binder can be discretionally selected.

According to the coating material for forming an anti-fouling coating film of the present embodiment, it is possible to form an anti-fouling coating film having improved cleanability against scorch to the anti-fouling coating film, in particular, against the scorched contaminant containing a sugar which is difficult to remove in an inorganic anti-fouling coating film of the related art. In addition, according to the coating material for forming an anti-fouling coating film of the present embodiment, it is possible to form an anti-fouling coating film having improved durability against an acid or an alkali as compared with the inorganic anti-fouling coating film of the related art. Furthermore, according to the coating material for forming an anti-fouling coating film of the present embodiment, it is possible to form an anti-fouling coating film having improved abrasion resistance while maintaining the cleanability or the durability against an acid or an alkali.

[Method for Producing Glass Ceramic Product]

In a method for producing a glass ceramic product of the present embodiment, the coating material for forming an anti-fouling coating film of the present embodiment is applied onto the surface of a substrate formed of glass-ceramic to form a coating film, and the coating film is heat-treated at a temperature of 650° C. or higher and 950° C. or lower to form an anti-fouling coating film on the surface of the substrate.

In the method for producing a glass ceramic product of the present embodiment, the coating material for forming an anti-fouling coating film is applied to at least a part of the surface of the substrate, for example, a region where there is a possibility of scorched stains or oil stains of a substance such as a food and the like to form the coating film.

As a method for applying the coating material for forming an anti-fouling coating film, for example, a spray coating method, a bar coating method, a spin coating method, a dip coating method, a roll coating method, a screen printing method, and the like are used.

When applying the coating material for forming an anti-fouling coating film, the thickness of the coating film can be discretionally selected, and for example, it is preferable to adjust the film thickness after heat treatment to be in a range of 10 nm or more and 200 nm or less.

The coating film thus formed is dried using a hot air dryer or the like. Thereafter, in order to dissipate the dispersion medium, the binder, and the like contained in the coating film, heat treatment is performed at a temperature of 650° C. or higher and 950° C. or lower in an air atmosphere using, for example, a high-temperature calcination furnace or the like to obtain the anti-fouling coating film of the present embodiment.

When the heat treatment temperature does not fall below 650° C., a strength of the obtained anti-fouling coating film does not deteriorate, which is preferable. On the other hand, when the heat treatment temperature does not exceed 950° C., the substrate is not deformed, which is preferable.

According to the method for producing a glass ceramic product of the present embodiment, it is possible to produce a glass ceramic product having the anti-fouling coating film having improved cleanability against scorch to the anti-fouling coating film, in particular, against the scorched contaminant containing a sugar which is difficult to remove in an inorganic anti-fouling coating film of the related art. In addition, according to the method for producing a glass ceramic product of the present embodiment, it is possible to produce the glass ceramic product having the anti-fouling coating film with improved durability against an acid or an alkali as compared with the inorganic anti-fouling coating film of the related art. Furthermore, according to the method for producing a glass ceramic product of the present embodiment, it is possible to produce the glass ceramic product having the anti-fouling coating film having improved abrasion resistance while maintaining the cleanability and the durability against an acid or an alkali.

EXAMPLES

Hereinafter, the present invention will be described in more detail with reference to Examples and Comparative Examples, but the present invention is not limited to the following Examples.

[Component of Coating Material for Forming Anti-Fouling Coating Film for Spray Coating]

The following components (1) to (5) were used as the components of the coating material for forming an anti-fouling coating film for spray coating of Examples 1 to 56 and Comparative Examples 2 to 65. Blending ratios of these components are shown in Table 1.

(1) Zirconium oxide fine particle aqueous dispersion (aqueous dispersion containing 4% by mass of zirconium oxide fine particles having an average particle diameter of 3 nm)

(2) 5% Aqueous solution of lanthanum nitrate hexahydrate (3) Silica sol (aqueous dispersion containing 10% by mass of silicon oxide particles having an average particle diameter of 3 nm)

(4) 1% Aqueous solution of phosphoric acid (5) 1% Aqueous solution of boric acid

[Component of Coating Material for Forming Anti-Fouling Coating Film for Screen Printing]

The above components (1) to (5) and the following component (6) were used as the components of the coating material for forming an anti-fouling coating film for screen printing of the anti-fouling coating film of Examples 57 to 100. Blending ratios of these components are shown in Table 1.

(6) Hydroxyethyl cellulose

TABLE 1

| | | | Blending weight percentage of raw material of coating film raw material liquid | | | | |
|---|---|---|---|---|---|---|---|
| | | Coating method | Zirconium oxide fine particle aqueous dispersion | 5% Aqueous solution of lanthanum nitrate hexahydrate | Silica sol | 1% Aqueous solution of phosphoric acid | 1% Aqueous solution of boric acid |
| Example | 1-8 | Spray coating | 38.00 | 20.21 | 1.00 | 0.00 | 0.00 |
| | 9-16 | | 33.25 | 30.32 | 1.00 | 0.00 | 0.00 |
| | 17-24 | | 27.75 | 39.36 | 1.50 | 0.00 | 0.00 |
| | 25-32 | | 23.13 | 49.20 | 1.50 | 0.00 | 0.00 |
| | 33-40 | | 28.50 | 40.43 | 1.00 | 0.00 | 0.00 |
| | 41-48 | | 27.75 | 39.36 | 0.00 | 20.72 | 0.00 |
| | 49-56 | | 27.75 | 39.36 | 0.00 | 0.00 | 26.65 |
| | 57-58 | Screen printing | 20.81 | 29.52 | 1.13 | 0.00 | 0.00 |
| | 59-60 | | 20.81 | 29.52 | 0.00 | 15.54 | 0.00 |
| | 61-62 | | 20.81 | 29.52 | 0.00 | 0.00 | 19.98 |
| | 63-64 | | 32.50 | 31.91 | 1.00 | 0.00 | 0.00 |
| | 65-66 | | 32.50 | 31.91 | 0.00 | 13.81 | 0.00 |
| | 67-72 | | 8.13 | 7.98 | 0.00 | 0.00 | 8.88 |
| | 73-78 | | 16.25 | 15.96 | 0.00 | 0.00 | 8.88 |
| | 79-84 | | 24.38 | 23.94 | 0.00 | 0.00 | 13.32 |
| | 85-90 | | 32.50 | 31.91 | 0.00 | 0.00 | 17.76 |
| | 91-92 | | 32.50 | 31.91 | 0.50 | 6.91 | 17.76 |
| | 93-98 | | 32.50 | 31.91 | 0.00 | 6.91 | 8.88 |
| | 99-100 | | 32.50 | 31.91 | 0.50 | 0.00 | 8.88 |
| Comparative Example | 2-9 | Spray coating | 29.25 | 41.49 | 0.50 | 0.00 | 0.00 |
| | 10-17 | | 22.38 | 47.61 | 2.10 | 0.00 | 0.00 |
| | 18-25 | | 18.50 | 59.04 | 1.50 | 0.00 | 0.00 |
| | 26-33 | | 46.25 | 0.00 | 1.50 | 0.00 | 0.00 |
| | 34-41 | | 38.95 | 18.19 | 1.00 | 0.00 | 0.00 |
| | 42-49 | | 37.00 | 19.68 | 1.50 | 0.00 | 0.00 |
| | 50-57 | | 32.03 | 29.20 | 1.70 | 0.00 | 0.00 |
| | 58-65 | | 27.00 | 38.30 | 2.00 | 0.00 | 0.00 |

| | | | Blending weight percentage of raw material of coating film raw material liquid | | | | |
|---|---|---|---|---|---|---|---|
| | | | Water | Propylene glycol monobutyl ether | Surfactant | Hydroxyethyl cellulose | Total |
| Example | 1-8 | | 39.78 | 1.00 | 0.01 | 0.00 | 100.00 |
| | 9-16 | | 34.42 | 1.00 | 0.01 | 0.00 | 100.00 |
| | 17-24 | | 30.38 | 1.00 | 0.01 | 0.00 | 100.00 |
| | 25-32 | | 25.16 | 1.00 | 0.01 | 0.00 | 100.00 |

TABLE 1-continued

|  |  |  |  |  |  |  |
|---|---|---|---|---|---|---|
|  | 33-40 | 29.06 | 1.00 | 0.01 | 0.00 | 100.00 |
|  | 41-48 | 11.16 | 1.00 | 0.01 | 0.00 | 100.00 |
|  | 49-56 | 5.23 | 1.00 | 0.01 | 0.00 | 100.00 |
|  | 57-58 | 44.03 | 2.00 | 0.01 | 2.50 | 100.00 |
|  | 59-60 | 29.62 | 2.00 | 0.01 | 2.50 | 100.00 |
|  | 61-62 | 25.17 | 2.00 | 0.01 | 2.50 | 100.00 |
|  | 63-64 | 30.08 | 2.00 | 0.01 | 2.50 | 100.00 |
|  | 65-66 | 17.26 | 2.00 | 0.01 | 2.50 | 100.00 |
|  | 67-72 | 75.93 | 2.00 | 0.01 | 2.50 | 100.00 |
|  | 73-78 | 54.40 | 2.00 | 0.01 | 2.50 | 100.00 |
|  | 79-84 | 33.86 | 2.00 | 0.01 | 2.50 | 100.00 |
|  | 85-90 | 13.31 | 2.00 | 0.01 | 2.50 | 100.00 |
|  | 91-92 | 5.91 | 2.00 | 0.01 | 2.50 | 100.00 |
|  | 93-98 | 15.29 | 2.00 | 0.01 | 2.50 | 100.00 |
|  | 99-100 | 21.69 | 2.00 | 0.01 | 2.50 | 100.00 |
| Comparative Example | 2-9 | 27.75 | 1.00 | 0.01 | 0.00 | 100.00 |
|  | 10-17 | 26.91 | 1.00 | 0.01 | 0.00 | 100.00 |
|  | 18-25 | 19.95 | 1.00 | 0.01 | 0.00 | 100.00 |
|  | 26-33 | 51.24 | 1.00 | 0.01 | 0.00 | 100.00 |
|  | 34-41 | 40.85 | 1.00 | 0.01 | 0.00 | 100.00 |
|  | 42-49 | 40.81 | 1.00 | 0.01 | 0.00 | 100.00 |
|  | 50-57 | 36.06 | 1.00 | 0.01 | 0.00 | 100.00 |
|  | 58-65 | 31.69 | 1.00 | 0.01 | 0.00 | 100.00 |

A mass ratio which is calculated from the blending ratio of the components shown in Table 1 in a case where the masses of zirconium, lanthanum, silicon, phosphorus, and boron were converted as masses of oxides, and a content (% by mass) of the mass in a case where the elements were converted as oxides with respect to the entire mass of the coating material for forming an anti-fouling coating film are shown in Table 2.

TABLE 2

|  |  | Coating method | Blending ratio when converted into oxide (% by mass) |  |  |  |  | Mass ratio of total oxides (% by mass) |
|---|---|---|---|---|---|---|---|---|
|  |  |  | $ZrO_2$ | $La_2O_3$ | $SiO_2$ | $P_2O_5$ | $B_2O_3$ |  |
| Example | 1-8 | Spray coating | 76.00 | 19.00 | 5.00 |  |  | 2.00 |
|  | 9-16 |  | 66.50 | 28.50 | 5.00 |  |  | 2.00 |
|  | 17-24 |  | 55.50 | 37.00 | 7.50 |  |  | 2.00 |
|  | 25-32 |  | 46.25 | 46.25 | 7.50 |  |  | 2.00 |
|  | 33-40 |  | 57.00 | 38.00 | 5.00 |  |  | 2.00 |
|  | 41-48 |  | 55.50 | 37.00 |  | 7.50 |  | 2.00 |
|  | 49-56 |  | 55.50 | 37.00 |  |  | 7.50 | 2.00 |
|  | 57-58 | Screen printing | 55.50 | 37.00 | 7.50 |  |  | 1.50 |
|  | 59-60 |  | 55.50 | 37.00 |  | 7.50 |  | 1.50 |
|  | 61-62 |  | 55.50 | 37.00 |  |  | 7.50 | 1.50 |
|  | 63-64 |  | 65.00 | 30.00 | 5.00 |  |  | 2.00 |
|  | 65-66 |  | 65.00 | 30.00 |  | 5.00 |  | 2.00 |
|  | 67-72 |  | 65.00 | 30.00 |  |  | 5.00 | 0.50 |
|  | 73-78 |  | 65.00 | 30.00 |  |  | 5.00 | 1.00 |
|  | 79-84 |  | 65.00 | 30.00 |  |  | 5.00 | 1.50 |
|  | 85-90 |  | 65.00 | 30.00 |  |  | 5.00 | 2.00 |
|  | 91-92 |  | 65.00 | 30.00 | 2.50 | 2.50 |  | 2.00 |
|  | 93-98 |  | 65.00 | 30.00 |  | 2.50 | 2.50 | 2.00 |
|  | 99-100 |  | 65.00 | 30.00 | 2.50 |  | 2.50 | 2.00 |
| Comparative Example | 2-9 | Spray coating | 58.50 | 39.00 | 2.50 |  |  | 2.00 |
|  | 10-17 |  | 44.75 | 44.75 | 10.50 |  |  | 2.00 |
|  | 18-25 |  | 37.00 | 55.50 | 7.50 |  |  | 2.00 |
|  | 26-33 |  | 92.50 | 0.00 | 7.50 |  |  | 2.00 |
|  | 34-41 |  | 77.90 | 17.10 | 5.00 |  |  | 2.00 |
|  | 42-49 |  | 74.00 | 18.50 | 7.50 |  |  | 2.00 |
|  | 50-57 |  | 64.05 | 27.45 | 8.50 |  |  | 2.00 |
|  | 58-65 |  | 54.00 | 36.00 | 10.00 |  |  | 2.00 |

[Preparation of Coating Material for Forming Anti-Fouling Coating Film for Spray Coating]

The coating material was prepared according to the blending ratios in Tables 1 and 2. First, for the above components (1) to (5), (I) a zirconium oxide fine particle aqueous dispersion, (II) 5% aqueous solution of lanthanum nitrate hexahydrate, and (III) silica sol, 1% aqueous solution of phosphoric acid, or 1% aqueous solution of boric acid were added in a 200 mL Pyrex (registered trademark) beaker in this order while stirring with a magnetic stirrer, so that the entire mass of the coating material for forming an anti-fouling coating film was 100 g. Then, propylene glycol monobutyl ether as a solvent and a surfactant were mixed in this order. As a result, the coating material for forming an anti-fouling coating film for spray coating of Examples 1 to 56 and Comparative Examples 2 to 65 were obtained.

[Preparation of Coating Material for Forming Anti-Fouling Coating Film for Screen Printing]

For the above components (1) to (5), according to the blending ratios in Tables 1 and 2, (I) a zirconium oxide fine particle aqueous dispersion, (II) 5% aqueous solution of lanthanum nitrate hexahydrate, and (III) silica sol, 1% aqueous solution of phosphoric acid, or 1% aqueous solution of boric acid were added in this order in a 900 mL glass bottle that can be sealed by a lid with a stirring seal, so that the entire mass of the coating material for forming an anti-fouling coating film was 300 g. Then, propylene glycol monobutyl ether as a solvent, hydroxyethyl cellulose as a binder, and a surfactant were added in this order to obtain a raw material liquid.

Next, the raw material liquid in the glass bottle was stirred at 600 rpm for 2 hours with a stirring blade made of Teflon (registered trademark) inserted into the glass bottle through the stirring seal of the lid of the glass bottle. As a result, the coating material for forming an anti-fouling coating film for screen printing of Examples 57 to 100 was obtained. During stirring, the glass bottle was warmed in a warm bath at 40.5° C.

[Measurement of Content of Non-Volatile Content of Coating Material for Forming Anti-Fouling Coating Film]

The content of non-volatile content of the coating material for forming an anti-fouling coating film of Examples 1 to 100 and Comparative Examples 2 to 65 was measured by the following method.

30 g of the coating material for forming an anti-fouling coating film was collected on a porcelain flat plate and calcinated in an electric furnace at 800° C. for 1 hour. Thereafter, a mass of a sample remaining in a magnetic crucible was measured. A proportion (% by mass) of a mass of the sample remaining in the magnetic crucible to a mass of the collected coating material for forming an anti-fouling coating film was calculated. Results are shown in Table 3.

TABLE 3

|  |  | Coating method | Non-volatile content (% by mass) |
|---|---|---|---|
| Example | 1-8 | Spray coating | 2.00 |
|  | 9-16 |  | 1.95 |
|  | 17-24 |  | 1.98 |
|  | 25-32 |  | 1.99 |
|  | 33-40 |  | 2.01 |
|  | 41-48 |  | 2.00 |
|  | 49-56 |  | 1.99 |
|  | 57-58 | Screen printing | 1.51 |
|  | 59-60 |  | 1.49 |
|  | 61-62 |  | 1.48 |
|  | 63-64 |  | 2.02 |
|  | 65-66 |  | 1.98 |
|  | 67-72 |  | 0.50 |
|  | 73-78 |  | 1.01 |
|  | 79-84 |  | 1.50 |
|  | 85-90 |  | 2.01 |
|  | 91-92 |  | 2.00 |
|  | 93-98 |  | 1.97 |
|  | 99-100 |  | 2.02 |
| Comparative Example | 2-9 | Spray coating | 2.02 |
|  | 10-17 |  | 2.00 |
|  | 18-25 |  | 1.98 |
|  | 26-33 |  | 2.04 |
|  | 34-41 |  | 1.99 |
|  | 42-49 |  | 2.02 |
|  | 50-57 |  | 2.00 |
|  | 58-65 |  | 2.03 |

From the results in Table 3, it was confirmed that the content of the non-volatile content was almost the same as the proportion of the mass in a case where the zirconium, the lanthanum, the silicon, the phosphorus, and the boron were converted as oxides shown in Table 2, that is, the content (% by mass) to the entire mass of the coating material for forming an anti-fouling coating film.

[Formation of Anti-Fouling Coating Film]

(Glass Ceramic Substrate)

Black crystallized glass seran manufactured by Schott AG was used as a glass ceramic substrate.

The glass ceramic substrate was cut into a rectangle of 50 mm×100 mm to obtain a test piece for spray coating.

In addition, the glass ceramic substrate was cut into a square having a side of 170 mm to obtain a test piece for screen printing.

(Spray Coating)

The test piece for spray coating described above was placed in an area of 20 cm×25 cm in a locally exhausted draft. Using the spray coating method, a coating film was formed by spraying the coating material for forming an anti-fouling coating film for spray coating on a surface of the test piece for spray coating.

As shown in Table 4 below, in the spraying, a spraying amount of the coating material for forming an anti-fouling coating film for spray coating was changed to 10.0 mL, 4.2 mL, 1.5 mL, and 1.0 mL.

TABLE 4

|  |  | Sprayed amount |
|---|---|---|
| Example | 1-2 | 10.0 |
|  | 3-4 | 4.2 |
|  | 5-6 | 1.5 |
|  | 7-8 | 1.0 |
|  | 9-10 | 10.0 |
|  | 11-12 | 4.2 |
|  | 13-14 | 1.5 |
|  | 15-16 | 1.0 |
|  | 17-18 | 10.0 |
|  | 19-20 | 4.2 |
|  | 21-22 | 1.5 |
|  | 23-24 | 1.0 |
|  | 25-26 | 10.0 |
|  | 27-28 | 4.2 |
|  | 29-30 | 1.5 |
|  | 31-32 | 1.0 |
|  | 33-34 | 10.0 |
|  | 35-36 | 4.2 |
|  | 37-38 | 1.5 |
|  | 39-40 | 1.0 |
|  | 41-42 | 10.0 |
|  | 43-44 | 4.2 |
|  | 45-46 | 1.5 |
|  | 47-48 | 1.0 |
|  | 49-50 | 10.0 |
|  | 51-52 | 4.2 |
|  | 53-54 | 1.5 |
|  | 55-56 | 1.0 |
| Comparative Example | 2-3 | 10.0 |
|  | 4-5 | 4.2 |
|  | 6-7 | 1.5 |
|  | 8-9 | 1.0 |
|  | 10-11 | 10.0 |
|  | 12-13 | 4.2 |
|  | 14-15 | 1.5 |
|  | 16-17 | 1.0 |
|  | 18-19 | 10.0 |
|  | 20-21 | 4.2 |
|  | 22-23 | 1.5 |
|  | 24-25 | 1.0 |
|  | 26-27 | 10.0 |
|  | 28-29 | 4.2 |
|  | 30-31 | 1.5 |
|  | 32-33 | 1.0 |
|  | 34-35 | 10.0 |
|  | 36-37 | 4.2 |
|  | 38-39 | 1.5 |
|  | 40-41 | 1.0 |
|  | 42-43 | 10.0 |

TABLE 4-continued

| | Sprayed amount |
|---|---|
| 44-45 | 4.2 |
| 46-47 | 1.5 |
| 48-49 | 1.0 |
| 50-51 | 10.0 |
| 52-53 | 4.2 |
| 54-55 | 1.5 |
| 56-57 | 1.0 |
| 58-59 | 10.0 |
| 60-61 | 4.2 |
| 62-63 | 1.5 |
| 64-65 | 1.0 |

(Screen Printing)

The coating material for forming an anti-fouling coating film for screen printing was kept in a constant temperature water tank at 25° C. for 30 minutes. Thereafter, three kinds of screens made of tetoron (registered trademark) manufactured by MITANI MICRONICS Co., Ltd., which had a square printing area with a side of 170 mm, were used for printing.

As shown in Table 5 below, the three kinds of screens have (1) a mesh number of 420/inch, a wire diameter of 27 μm, and a mesh thickness (gauze thickness) of 40 μm, (2) a mesh number of 355/inch, a wire diameter of 35 μm, and a mesh thickness 61 μm, and (3) a mesh number of 255/inch, a wire diameter of 40 μm, a mesh thickness of 60 μm, respectively.

Using these screens made of tetoron (registered trademark), the coating material for forming an anti-fouling coating film for screen printing was applied onto the surface of the test piece for screen printing described above to form a coating film.

TABLE 5

| | | Screen | | |
|---|---|---|---|---|
| | | Mesh number (/inch) | Wire diameter (μm) | Gauze thickness (μm) |
| Example | 57-58 | 420 | 27 | 40 |
| | 59-60 | 420 | 27 | 40 |
| | 61-62 | 420 | 27 | 40 |
| | 63-64 | 420 | 27 | 40 |
| | 65-66 | 420 | 27 | 40 |
| | 67-68 | 420 | 27 | 40 |
| | 69-70 | 355 | 35 | 61 |
| | 71-72 | 255 | 40 | 60 |
| | 73-74 | 420 | 27 | 40 |
| | 75-76 | 355 | 35 | 61 |
| | 77-78 | 255 | 40 | 60 |
| | 79-80 | 420 | 27 | 40 |
| | 81-82 | 355 | 35 | 61 |
| | 83-84 | 255 | 40 | 60 |
| | 85-86 | 420 | 27 | 40 |
| | 87-88 | 355 | 35 | 61 |
| | 89-90 | 255 | 40 | 60 |
| | 91-92 | 420 | 27 | 40 |
| | 93-94 | 420 | 27 | 40 |
| | 95-96 | 355 | 35 | 61 |
| | 97-98 | 255 | 40 | 60 |
| | 99-100 | 420 | 27 | 40 |

(Heat Treatment of Spray Coated Coating Film)

The test piece having the coating film formed by spray coating was dried at a room temperature. Thereafter, heat treatment was performed in an electric furnace.

The heat treatment temperature in the electric furnace was set to 800° C. or 900° C., and after the temperature in the electric furnace was sufficiently stabilized, the test piece was placed in the electric furnace. Thereafter, heat treatment was performed for 30 minutes to form an anti-fouling coating film.

(Heat Treatment of Screen Printed Coating Film)

The test piece on which the coating film was formed by screen printing was dried for 10 minutes in a dryer maintained at 100° C. Thereafter, heat treatment was performed in an electric furnace.

The heat treatment temperature in the electric furnace was set to 800° C. or 900° C., and the temperature in the electric furnace was sufficiently stabilized. Thereafter, the test piece was placed in the electric furnace and the heat treatment was performed for 30 minutes to form an anti-fouling coating film.

[Measurement of Adhesion Amount of Each Component of Anti-Fouling Coating Film]

Using a quantitative analysis by a fluorescent X-ray method, an adhesion amount of $ZrO_2$, $La_2O_3$, $SiO_2$, $P_2O_5$, and $B_2O_3$ per 1 square meter of the surface of the test piece was measured.

However, the glass ceramic substrate may contain a part or all of the components in a substrate itself. Accordingly, it is not possible to directly measure only the adhesion amount of the anti-fouling coating film formed on the surface of the test piece, which is a glass ceramic substrate, by the fluorescent X-ray method. That is, there is a possibility that a value of the substrate is also measured. Therefore, the content of the components of the anti-fouling coating film formed on the surface of the test piece was indirectly analyzed by the following method.

In a case of the spray coating, a stainless steel sheet was placed in a coating area together with the glass ceramic substrate, and a similar coating film was formed on the steel plate.

In addition, in a case of the screen printing, the coating film was formed on the stainless steel sheet under the same conditions as in the case of the coating film was formed on the glass ceramic substrate.

Thereafter, the stainless steel sheet on which the coating film was formed by spray coating and the stainless steel sheet on which the coating film was formed by screen printing were dried in a dryer at 250° C. for 10 minutes. Thereafter, the adhesion amount of each component of the anti-fouling coating film formed on the surface of each stainless steel sheet was measured by quantitative analysis of the fluorescent X-ray method.

These measurement results are shown in Tables 6 to 9 as the component amount of the anti-fouling coating film of Examples 1 to 100, and shown in Tables 10 to 12 as the component amount of the anti-fouling coating film of Comparative Examples 2 to 65.

[Measurement of Visual Reflectance of Surface of Anti-Fouling Coating Film]

Using a spectrophotometer V-770 manufactured by JASCO Corporation, 5° reflection spectra of the surface of the anti-fouling coating film and the surface of the glass ceramic substrate were measured in a wavelength range of 380 nm to 800 nm. The visual reflectance $R_1\%$ of the surface of the anti-fouling coating film and the visual reflectance $R_2$% of the surface of the glass ceramic substrate were measured by the following formula (α).

$$\text{Visual reflectance (\%)} = \Sigma R(\lambda)V(\lambda)/\Sigma V(\lambda) \quad (\alpha)$$

(However, in the calculation formula (α), R indicates a reflectance (%) and V indicates a relative luminous efficiency.)

A difference $(R_1-R_2)$ between the visual reflectance $R_1$% of the surface of the anti-fouling coating film and the visual reflectance $R_2$% of the surface of the glass ceramic substrate was set as ΔR.

The ΔRs of Examples 1 to 100 are shown in Tables 6 to 9, and the ΔRs of Comparative Examples 2 to 65 are shown in Tables 10 to 12.

TABLE 6

| | | Analysis value of anti-fouling coating film component | | | | | | | |
|---|---|---|---|---|---|---|---|---|---|
| | | Analysis value of adhesion amount of components of anti-fouling coating film by fluorescent X-rays (mg/m²) | | | | | | X = $La_2O_3/(ZrO_2 + La_2O_3) \times 100$ (% by mass) | Y = $(ZrO_2 + La_2O_3)/$ Entire anti-fouling coating film × 100 (% by mass) |
| | | $ZrO_2$ | $La_2O_3$ | $SiO_2$ | $P_2O_5$ | $B_2O_3$ | Total | | |
| Example | 1 | 299.4 | 75.8 | 20.2 | 0.0 | 0.0 | 395.3 | 20.2 | 94.9 |
| | 2 | | | | | | | | |
| | 3 | 134.1 | 33.5 | 9.4 | 0.0 | 0.0 | 177.0 | 20.0 | 94.7 |
| | 4 | | | | | | | | |
| | 5 | 47.4 | 11.9 | 3.1 | 0.0 | 0.0 | 62.5 | 20.1 | 95.0 |
| | 6 | | | | | | | | |
| | 7 | 31.4 | 8.0 | 2.2 | 0.0 | 0.0 | 41.6 | 20.3 | 94.8 |
| | 8 | | | | | | | | |
| | 9 | 264.3 | 116.0 | 20.4 | 0.0 | 0.0 | 400.8 | 30.5 | 94.9 |
| | 10 | | | | | | | | |
| | 11 | 116.1 | 49.3 | 8.7 | 0.0 | 0.0 | 174.1 | 29.8 | 95.0 |
| | 12 | | | | | | | | |
| | 13 | 41.0 | 18.2 | 3.2 | 0.0 | 0.0 | 62.4 | 30.7 | 94.8 |
| | 14 | | | | | | | | |
| | 15 | 26.1 | 11.9 | 2.0 | 0.0 | 0.0 | 40.0 | 31.2 | 95.0 |
| | 16 | | | | | | | | |
| | 17 | 212.4 | 138.6 | 29.7 | 0.0 | 0.0 | 380.7 | 39.5 | 92.2 |
| | 18 | | | | | | | | |
| | 19 | 89.8 | 61.9 | 12.0 | 0.0 | 0.0 | 163.7 | 40.8 | 92.7 |
| | 20 | | | | | | | | |
| | 21 | 35.3 | 24.0 | 4.9 | 0.0 | 0.0 | 64.2 | 40.5 | 92.4 |
| | 22 | | | | | | | | |
| | 23 | 25.2 | 15.6 | 3.1 | 0.0 | 0.0 | 43.9 | 38.3 | 92.8 |
| | 24 | | | | | | | | |

| | | Analysis value of anti-fouling coating film component Z = $(SiO_2 + P_2O_5 + B_2O_3)/$ Entire anti-fouling coating film × 100 (% by mass) | W = $6 + (X - 20)/6$ | Calcination temperature | ΔR |
|---|---|---|---|---|---|
| Example | 1 | 5.1 | 6.0 | 800° C. | 11.9 |
| | 2 | | | 900° C. | 11.5 |
| | 3 | 5.3 | 6.0 | 800° C. | 5.2 |
| | 4 | | | 900° C. | 4.9 |
| | 5 | 5.0 | 6.0 | 800° C. | 1.2 |
| | 6 | | | 900° C. | 1.1 |
| | 7 | 5.2 | 6.1 | 800° C. | 0.5 |
| | 8 | | | 900° C. | 0.4 |
| | 9 | 5.1 | 7.8 | 800° C. | 11.7 |
| | 10 | | | 900° C. | 11.2 |
| | 11 | 5.0 | 7.6 | 800° C. | 5.5 |
| | 12 | | | 900° C. | 5.2 |
| | 13 | 5.2 | 7.8 | 800° C. | 1.2 |
| | 14 | | | 900° C. | 1.1 |
| | 15 | 5.0 | 7.9 | 800° C. | 0.5 |
| | 16 | | | 900° C. | 0.4 |
| | 17 | 7.8 | 9.3 | 800° C. | 11.6 |
| | 18 | | | 900° C. | 11.3 |
| | 19 | 7.3 | 9.5 | 800° C. | 4.7 |
| | 20 | | | 900° C. | 4.6 |
| | 21 | 7.6 | 9.4 | 800° C. | 1.1 |
| | 22 | | | 900° C. | 1.0 |
| | 23 | 7.2 | 9.1 | 800° C. | 0.4 |
| | 24 | | | 900° C. | 0.4 |

TABLE 7

| | | Analysis value of anti-fouling coating film component | | | | | | | |
|---|---|---|---|---|---|---|---|---|---|
| | | Analysis value of adhesion amount of components of anti-fouling coating film by fluorescent X-rays (mg/m$^2$) | | | | | | X = La$_2$O$_3$/(ZrO$_2$ + La$_2$O$_3$) × 100 | Y = (ZrO$_2$ + La$_2$O$_3$)/ Entire anti-fouling coating film × 100 |
| | | ZrO$_2$ | La$_2$O$_3$ | SiO$_2$ | P$_2$O$_5$ | B$_2$O$_3$ | Total | (% by mass) | (% by mass) |
| Example | 25 | 183.6 | 182.2 | 28.8 | 0.0 | 0.0 | 394.6 | 49.8 | 92.7 |
| | 26 | | | | | | | | |
| | 27 | 86.7 | 86.4 | 14.0 | 0.0 | 0.0 | 187.1 | 49.9 | 92.5 |
| | 28 | | | | | | | | |
| | 29 | 29.7 | 29.7 | 4.7 | 0.0 | 0.0 | 64.0 | 50.0 | 92.7 |
| | 30 | | | | | | | | |
| | 31 | 20.4 | 19.5 | 3.3 | 0.0 | 0.0 | 43.3 | 48.9 | 92.3 |
| | 32 | | | | | | | | |
| | 33 | 226.3 | 152.1 | 20.8 | 0.0 | 0.0 | 399.1 | 40.2 | 94.8 |
| | 34 | | | | | | | | |
| | 35 | 105.2 | 66.6 | 9.0 | 0.0 | 0.0 | 180.8 | 38.7 | 95.0 |
| | 36 | | | | | | | | |
| | 37 | 34.2 | 23.7 | 3.1 | 0.0 | 0.0 | 61.0 | 40.9 | 94.9 |
| | 38 | | | | | | | | |
| | 39 | 23.7 | 15.3 | 2.2 | 0.0 | 0.0 | 41.2 | 39.2 | 94.6 |
| | 40 | | | | | | | | |
| | 41 | 223.1 | 143.2 | 0.0 | 29.7 | 0.0 | 396.0 | 39.1 | 92.5 |
| | 42 | | | | | | | | |
| | 43 | 92.8 | 62.2 | 0.0 | 12.0 | 0.0 | 167.0 | 40.1 | 92.8 |
| | 44 | | | | | | | | |
| | 45 | 34.7 | 21.5 | 0.0 | 4.5 | 0.0 | 60.7 | 38.2 | 92.6 |
| | 46 | | | | | | | | |
| | 47 | 23.2 | 14.8 | 0.0 | 2.9 | 0.0 | 40.9 | 38.9 | 93.0 |
| | 48 | | | | | | | | |

| | | Analysis value of anti-fouling coating film component Z = (SiO$_2$ + P$_2$O$_5$ + B$_2$O$_3$)/ Entire anti-fouling coating film × 100 (% by mass) | W = 6 + (X − 20)/6 | Calcination temperature | ΔR |
|---|---|---|---|---|---|
| Example | 25 | 7.3 | 11.0 | 800° C. | 12.2 |
| | 26 | | | 900° C. | 12.0 |
| | 27 | 7.5 | 11.0 | 800° C. | 5.1 |
| | 28 | | | 900° C. | 5.0 |
| | 29 | 7.3 | 11.0 | 800° C. | 1.2 |
| | 30 | | | 900° C. | 1.0 |
| | 31 | 7.7 | 10.8 | 800° C. | 0.5 |
| | 32 | | | 900° C. | 0.5 |
| | 33 | 5.2 | 9.4 | 800° C. | 12.0 |
| | 34 | | | 900° C. | 11.7 |
| | 35 | 5.0 | 9.1 | 800° C. | 5.1 |
| | 36 | | | 900° C. | 5.0 |
| | 37 | 5.1 | 9.5 | 800° C. | 1.1 |
| | 38 | | | 900° C. | 1.0 |
| | 39 | 5.4 | 9.2 | 800° C. | 0.4 |
| | 40 | | | 900° C. | 0.4 |
| | 41 | 7.5 | 9.2 | 800° C. | 11.4 |
| | 42 | | | 900° C. | 11.2 |
| | 43 | 7.2 | 9.4 | 800° C. | 5.5 |
| | 44 | | | 900° C. | 5.4 |
| | 45 | 7.4 | 9.0 | 800° C. | 1.1 |
| | 46 | | | 900° C. | 1.1 |
| | 47 | 7.0 | 9.2 | 800° C. | 0.4 |
| | 48 | | | 900° C. | 0.4 |

TABLE 8

| | | Analysis value of adhesion amount of components of anti-fouling coating film by fluorescent X-rays (mg/m²) | | | | | | X = La$_2$O$_3$/(ZrO$_2$ + La$_2$O$_3$) × 100 (% by mass) | Y = (ZrO$_2$ + La$_2$O$_3$)/ Entire anti-fouling coating film × 100 (% by mass) |
|---|---|---|---|---|---|---|---|---|---|
| | | ZrO$_2$ | La$_2$O$_3$ | SiO$_2$ | P$_2$O$_5$ | B$_2$O$_3$ | Total | | |
| Example | 49 | 218.5 | 137.9 | 0.0 | 0.0 | 31.0 | 387.4 | 38.7 | 92.0 |
| | 50 | | | | | | | | |
| | 51 | 90.4 | 65.8 | 0.0 | 0.0 | 12.6 | 168.7 | 42.1 | 92.5 |
| | 52 | | | | | | | | |
| | 53 | 31.1 | 21.5 | 0.0 | 0.0 | 4.4 | 57.1 | 40.9 | 92.2 |
| | 54 | | | | | | | | |
| | 55 | 23.3 | 15.6 | 0.0 | 0.0 | 3.3 | 42.1 | 40.0 | 92.2 |
| | 56 | | | | | | | | |
| | 57 | 94.0 | 64.6 | 12.8 | 0.0 | 0.0 | 171.4 | 40.7 | 92.5 |
| | 58 | | | | | | | | |
| | 59 | 97.7 | 64.4 | 0.0 | 12.4 | 0.0 | 174.5 | 39.7 | 92.9 |
| | 60 | | | | | | | | |
| | 61 | 93.8 | 65.0 | 0.0 | 0.0 | 13.1 | 171.9 | 40.9 | 92.4 |
| | 62 | | | | | | | | |
| | 63 | 150.7 | 66.7 | 13.1 | 0.0 | 0.0 | 230.5 | 30.7 | 94.3 |
| | 64 | | | | | | | | |
| | 65 | 157.2 | 74.7 | 0.0 | 14.7 | 0.0 | 246.7 | 32.2 | 94.0 |
| | 66 | | | | | | | | |
| | 67 | 27.5 | 12.9 | 0.0 | 0.0 | 2.3 | 42.7 | 32.0 | 94.5 |
| | 68 | | | | | | | | |
| | 69 | 39.4 | 17.6 | 0.0 | 0.0 | 3.1 | 60.0 | 30.8 | 94.9 |
| | 70 | | | | | | | | |
| | 71 | 53.4 | 23.6 | 0.0 | 0.0 | 4.6 | 81.7 | 30.7 | 94.3 |
| | 72 | | | | | | | | |

| | | Analysis value of anti-fouling coating film component Z = (SiO$_2$ + P$_2$O$_5$ + B$_2$O$_3$)/ Entire anti-fouling coating film × 100 (% by mass) | W = 6 + (X − 20)/6 | Calcination temperature | ΔR |
|---|---|---|---|---|---|
| Example | 49 | 8.0 | 9.1 | 800° C. | 11.4 |
| | 50 | | | 900° C. | 11.1 |
| | 51 | 7.5 | 9.7 | 800° C. | 4.7 |
| | 52 | | | 900° C. | 4.6 |
| | 53 | 7.8 | 9.5 | 800° C. | 1.0 |
| | 54 | | | 900° C. | 1.0 |
| | 55 | 7.8 | 9.3 | 800° C. | 0.6 |
| | 56 | | | 900° C. | 0.6 |
| | 57 | 7.5 | 9.5 | 800° C. | 4.9 |
| | 58 | | | 900° C. | 4.8 |
| | 59 | 7.1 | 9.3 | 800° C. | 5.2 |
| | 60 | | | 900° C. | 5.1 |
| | 61 | 7.6 | 9.5 | 800° C. | 4.9 |
| | 62 | | | 900° C. | 4.7 |
| | 63 | 5.7 | 7.8 | 800° C. | 8.5 |
| | 64 | | | 900° C. | 8.0 |
| | 65 | 6.0 | 8.0 | 800° C. | 8.7 |
| | 66 | | | 900° C. | 8.4 |
| | 67 | 5.5 | 8.0 | 800° C. | 0.4 |
| | 68 | | | 900° C. | 0.4 |
| | 69 | 5.1 | 7.8 | 800° C. | 0.9 |
| | 70 | | | 900° C. | 0.8 |
| | 71 | 5.7 | 7.8 | 800° C. | 2.2 |
| | 72 | | | 900° C. | 1.9 |

TABLE 9

| | | Analysis value of anti-fouling coating film component | | | | | | | |
|---|---|---|---|---|---|---|---|---|---|
| | | Analysis value of adhesion amount of components of anti-fouling coating film by fluorescent X-rays (mg/m$^2$) | | | | | | $X = $ $La_2O_3/(ZrO_2 + La_2O_3) \times 100$ (% by mass) | $Y = $ $(ZrO_2 + La_2O_3)/$ Entire anti-fouling coating film $\times 100$ (% by mass) |
| | | $ZrO_2$ | $La_2O_3$ | $SiO_2$ | $P_2O_5$ | $B_2O_3$ | Total | | |
| Example | 73 | 81.8 | 36.8 | 0.0 | 0.0 | 7.1 | 125.7 | 31.0 | 94.3 |
| | 74 | | | | | | | | |
| | 75 | 96.8 | 44.4 | 0.0 | 0.0 | 8.8 | 150.1 | 31.4 | 94.1 |
| | 76 | | | | | | | | |
| | 77 | 138.5 | 65.8 | 0.0 | 0.0 | 11.9 | 216.2 | 32.2 | 94.5 |
| | 78 | | | | | | | | |
| | 79 | 115.2 | 55.0 | 0.0 | 0.0 | 9.3 | 179.5 | 32.3 | 94.8 |
| | 80 | | | | | | | | |
| | 81 | 157.8 | 69.9 | 0.0 | 0.0 | 13.5 | 241.2 | 30.7 | 94.4 |
| | 82 | | | | | | | | |
| | 83 | 214.7 | 95.0 | 0.0 | 0.0 | 16.4 | 326.1 | 30.7 | 95.0 |
| | 84 | | | | | | | | |
| | 85 | 165.7 | 76.2 | 0.0 | 0.0 | 13.0 | 254.9 | 31.5 | 94.9 |
| | 86 | | | | | | | | |
| | 87 | 211.1 | 97.1 | 0.0 | 0.0 | 17.2 | 325.4 | 31.5 | 94.7 |
| | 88 | | | | | | | | |
| | 89 | 285.9 | 126.3 | 0.0 | 0.0 | 22.9 | 435.1 | 30.6 | 94.7 |
| | 90 | | | | | | | | |
| | 91 | 157.5 | 73.6 | 7.3 | 7.2 | 0.0 | 245.6 | 31.8 | 94.1 |
| | 92 | | | | | | | | |
| | 93 | 154.2 | 72.5 | 0.0 | 5.9 | 6.1 | 238.7 | 32.0 | 95.0 |
| | 94 | | | | | | | | |
| | 95 | 213.0 | 97.2 | 0.0 | 8.5 | 8.8 | 327.5 | 31.3 | 94.7 |
| | 96 | | | | | | | | |
| | 97 | 279.6 | 125.3 | 0.0 | 12.3 | 13.3 | 430.5 | 30.9 | 94.1 |
| | 98 | | | | | | | | |
| | 99 | 151.0 | 72.9 | 6.6 | 0.0 | 6.7 | 237.2 | 32.6 | 94.4 |
| | 100 | | | | | | | | |

| | | Analysis value of anti-fouling coating film component | | | |
|---|---|---|---|---|---|
| | | $Z = $ $(SiO_2 + P_2O_5 + B_2O_3)/$ Entire anti-fouling coating film $\times 100$ (% by mass) | $W = $ $6 + (X - 20)/6$ | Calcination temperature | ΔR |
| Example | 73 | 5.7 | 7.8 | 800° C. | 4.1 |
| | 74 | | | 900° C. | 3.9 |
| | 75 | 5.9 | 7.9 | 800° C. | 4.5 |
| | 76 | | | 900° C. | 4.4 |
| | 77 | 5.5 | 8.0 | 800° C. | 6.5 |
| | 78 | | | 900° C. | 6.2 |
| | 79 | 5.2 | 8.1 | 800° C. | 5.8 |
| | 80 | | | 900° C. | 5.6 |
| | 81 | 5.6 | 7.8 | 800° C. | 7.7 |
| | 82 | | | 900° C. | 7.3 |
| | 83 | 5.0 | 7.8 | 800° C. | 10.5 |
| | 84 | | | 900° C. | 10.0 |
| | 85 | 5.1 | 7.9 | 800° C. | 8.0 |
| | 86 | | | 900° C. | 7.7 |
| | 87 | 5.3 | 7.9 | 800° C. | 10.8 |
| | 88 | | | 900° C. | 10.2 |
| | 89 | 5.3 | 7.8 | 800° C. | 12.4 |
| | 90 | | | 900° C. | 11.8 |
| | 91 | 5.9 | 8.0 | 800° C. | 7.9 |
| | 92 | | | 900° C. | 7.7 |
| | 93 | 5.0 | 8.0 | 800° C. | 7.7 |
| | 94 | | | 900° C. | 7.6 |
| | 95 | 5.3 | 7.9 | 800° C. | 10.5 |
| | 96 | | | 900° C. | 10.2 |
| | 97 | 5.9 | 7.8 | 800° C. | 12.4 |
| | 98 | | | 900° C. | 12.0 |
| | 99 | 5.6 | 8.1 | 800° C. | 7.6 |
| | 100 | | | 900° C. | 7.4 |

TABLE 10

| | | Analysis value of anti-fouling coating film component | | | | | | | |
|---|---|---|---|---|---|---|---|---|---|
| | | Analysis value of adhesion amount of components of anti-fouling coating film by fluorescent X-rays (mg/m$^2$) | | | | | | X = La$_2$O$_3$/(ZrO$_2$ + La$_2$O$_3$) × 100 (% by mass) | Y = (ZrO$_2$ + La$_2$O$_3$)/ Entire anti-fouling coating film × 100 (% by mass) |
| | | ZrO$_2$ | La$_2$O$_3$ | SiO$_2$ | P$_2$O$_5$ | B$_2$O$_3$ | Total | | |
| Comparative Example | 2 | 233.7 | 152.6 | 9.1 | 0.0 | 0.0 | 395.3 | 39.5 | 97.7 |
| | 3 | | | | | | | | |
| | 4 | 104.9 | 66.9 | 4.3 | 0.0 | 0.0 | 176.1 | 38.9 | 97.5 |
| | 5 | | | | | | | | |
| | 6 | 37.5 | 26.7 | 1.7 | 0.0 | 0.0 | 65.9 | 41.6 | 97.3 |
| | 7 | | | | | | | | |
| | 8 | 24.8 | 16.9 | 1.0 | 0.0 | 0.0 | 42.7 | 40.5 | 97.6 |
| | 9 | | | | | | | | |
| | 10 | 185.3 | 183.9 | 42.4 | 0.0 | 0.0 | 411.6 | 49.8 | 89.7 |
| | 11 | | | | | | | | |
| | 12 | 79.8 | 78.2 | 18.3 | 0.0 | 0.0 | 176.4 | 49.5 | 89.6 |
| | 13 | | | | | | | | |
| | 14 | 30.4 | 30.3 | 7.3 | 0.0 | 0.0 | 67.9 | 49.9 | 89.3 |
| | 15 | | | | | | | | |
| | 16 | 17.3 | 17.3 | 4.1 | 0.0 | 0.0 | 38.6 | 50.0 | 89.5 |
| | 17 | | | | | | | | |
| | 18 | 140.6 | 217.1 | 26.5 | 0.0 | 0.0 | 384.2 | 60.7 | 93.1 |
| | 19 | | | | | | | | |
| | 20 | 64.1 | 94.8 | 13.5 | 0.0 | 0.0 | 168.4 | 59.6 | 94.4 |
| | 21 | | | | | | | | |
| | 22 | 20.6 | 32.4 | 4.1 | 0.0 | 0.0 | 57.1 | 61.2 | 92.8 |
| | 23 | | | | | | | | |
| | 24 | 14.7 | 22.7 | 3.0 | 0.0 | 0.0 | 40.4 | 60.7 | 92.7 |
| | 25 | | | | | | | | |

| | | Analysis value of anti-fouling coating film component Z = (SiO$_2$ + P$_2$O$_5$ + B$_2$O$_3$)/ Entire anti-fouling coating film × 100 (% by mass) | W = 6 + (X − 20)/6 | Calcination temperature | ΔR |
|---|---|---|---|---|---|
| Comparative Example | 2 | 2.3 | 9.3 | 800° C. | 11.7 |
| | 3 | | | 900° C. | 11.3 |
| | 4 | 2.5 | 9.2 | 800° C. | 4.9 |
| | 5 | | | 900° C. | 4.9 |
| | 6 | 2.6 | 9.6 | 800° C. | 1.4 |
| | 7 | | | 900° C. | 1.3 |
| | 8 | 2.4 | 9.4 | 800° C. | 0.5 |
| | 9 | | | 900° C. | 0.4 |
| | 10 | 10.3 | 11.0 | 800° C. | 11.9 |
| | 11 | | | 900° C. | 11.5 |
| | 12 | 10.4 | 10.9 | 800° C. | 4.9 |
| | 13 | | | 900° C. | 4.8 |
| | 14 | 10.7 | 11.0 | 800° C. | 1.1 |
| | 15 | | | 900° C. | 1.0 |
| | 16 | 10.5 | 11.0 | 800° C. | 0.7 |
| | 17 | | | 900° C. | 0.7 |
| | 18 | 6.9 | 12.8 | 800° C. | 11.6 |
| | 19 | | | 900° C. | 11.2 |
| | 20 | 8.0 | 12.6 | 800° C. | 4.8 |
| | 21 | | | 900° C. | 4.7 |
| | 22 | 7.2 | 12.9 | 800° C. | 1.1 |
| | 23 | | | 900° C. | 1.0 |
| | 24 | 7.3 | 12.8 | 800° C. | 0.4 |
| | 25 | | | 900° C. | 0.4 |

TABLE 11

| | | Analysis value of anti-fouling coating film component | | | | | | | |
|---|---|---|---|---|---|---|---|---|---|
| | | Analysis value of adhesion amount of components of anti-fouling coating film by fluorescent X-rays (mg/m$^2$) | | | | | | $X =$ $La_2O_3/(ZrO_2 + La_2O_3) \times 100$ (% by mass) | $Y =$ $(ZrO_2 + La_2O_3)/$ Entire anti-fouling coating film $\times$ 100 (% by mass) |
| | | $ZrO_2$ | $La_2O_3$ | $SiO_2$ | $P_2O_5$ | $B_2O_3$ | Total | | |
| Comparative Example | 26 | 367.0 | 0.0 | 30.2 | 0.0 | 0.0 | 397.2 | 0.0 | 92.4 |
| | 27 | | | | | | | | |
| | 28 | 167.9 | 0.0 | 12.5 | 0.0 | 0.0 | 180.4 | 0.0 | 93.1 |
| | 29 | | | | | | | | |
| | 30 | 54.7 | 0.0 | 4.3 | 0.0 | 0.0 | 59.1 | 0.0 | 92.6 |
| | 31 | | | | | | | | |
| | 32 | 36.0 | 0.0 | 3.1 | 0.0 | 0.0 | 39.1 | 0.0 | 92.1 |
| | 33 | | | | | | | | |
| | 34 | 302.2 | 67.7 | 20.3 | 0.0 | 0.0 | 390.2 | 18.3 | 94.8 |
| | 35 | | | | | | | | |
| | 36 | 131.4 | 28.6 | 8.6 | 0.0 | 0.0 | 168.6 | 17.9 | 94.9 |
| | 37 | | | | | | | | |
| | 38 | 51.7 | 11.2 | 3.3 | 0.0 | 0.0 | 66.2 | 17.8 | 95.0 |
| | 39 | | | | | | | | |
| | 40 | 33.8 | 7.5 | 2.2 | 0.0 | 0.0 | 43.5 | 18.2 | 94.9 |
| | 41 | | | | | | | | |
| | 42 | 289.2 | 73.2 | 29.8 | 0.0 | 0.0 | 392.2 | 20.2 | 92.4 |
| | 43 | | | | | | | | |
| | 44 | 131.4 | 33.7 | 14.0 | 0.0 | 0.0 | 179.1 | 20.4 | 92.2 |
| | 45 | | | | | | | | |
| | 46 | 44.8 | 11.3 | 4.4 | 0.0 | 0.0 | 60.5 | 20.1 | 92.7 |
| | 47 | | | | | | | | |
| | 48 | 29.9 | 7.9 | 2.8 | 0.0 | 0.0 | 40.7 | 20.9 | 93.0 |
| | 49 | | | | | | | | |

| | | Analysis value of anti-fouling coating film component | | | |
|---|---|---|---|---|---|
| | | $Z =$ $(SiO_2 + P_2O_5 + B_2O_3)/$ Entire anti-fouling coating film $\times$ 100 (% by mass) | $W =$ $6 + (X - 20)/6$ | Calcination temperature | $\Delta R$ |
| Comparative Example | 26 | 7.6 | 2.7 | 800° C. | 11.5 |
| | 27 | | | 900° C. | 11.4 |
| | 28 | 6.9 | 2.7 | 800° C. | 5.1 |
| | 29 | | | 900° C. | 4.9 |
| | 30 | 7.3 | 2.7 | 800° C. | 1.1 |
| | 31 | | | 900° C. | 1.1 |
| | 32 | 7.9 | 2.7 | 800° C. | 0.4 |
| | 33 | | | 900° C. | 0.4 |
| | 34 | 5.2 | 5.7 | 800° C. | 12.3 |
| | 35 | | | 900° C. | 11.8 |
| | 36 | 5.1 | 5.7 | 800° C. | 4.9 |
| | 37 | | | 900° C. | 4.9 |
| | 38 | 5.0 | 5.6 | 800° C. | 1.3 |
| | 39 | | | 900° C. | 1.1 |
| | 40 | 5.1 | 5.7 | 800° C. | 0.5 |
| | 41 | | | 900° C. | 0.5 |
| | 42 | 7.6 | 6.0 | 800° C. | 12.0 |
| | 43 | | | 900° C. | 11.9 |
| | 44 | 7.8 | 6.1 | 800° C. | 4.9 |
| | 45 | | | 900° C. | 4.8 |
| | 46 | 7.3 | 6.0 | 800° C. | 1.1 |
| | 47 | | | 900° C. | 1.0 |
| | 48 | 7.0 | 6.2 | 800° C. | 0.6 |
| | 49 | | | 900° C. | 0.5 |

TABLE 12

| | | Analysis value of adhesion amount of components of anti-fouling coating film by fluorescent X-rays (mg/m²) | | | | | | X = La₂O₃/(ZrO₂ + La₂O₃) × 100 (% by mass) | Y = (ZrO₂ + La₂O₃)/ Entire anti-fouling coating film × 100 (% by mass) | Z = (SiO₂ + P₂O₅ + B₂O₃)/ Entire anti-fouling coating film × 100 (% by mass) | W = 6 + (X − 20)/6 | Calcination temperature | ΔR |
|---|---|---|---|---|---|---|---|---|---|---|---|---|---|
| | | $ZrO_2$ | $La_2O_3$ | $SiO_2$ | $P_2O_5$ | $B_2O_3$ | Total | | | | | | |
| Comparative Example | 50 | 259.6 | 110.7 | 34.8 | 0.0 | 0.0 | 405.2 | 29.9 | 91.4 | 8.6 | 7.7 | 800° C. | 12.2 |
| | 51 | | | | | | | | | | | 900° C. | 11.8 |
| | 52 | 105.6 | 45.5 | 14.0 | 0.0 | 0.0 | 165.1 | 30.1 | 91.5 | 8.5 | 7.7 | 800° C. | 5.0 |
| | 53 | | | | | | | | | | | 900° C. | 4.9 |
| | 54 | 41.1 | 17.6 | 5.3 | 0.0 | 0.0 | 64.1 | 30.0 | 91.7 | 8.3 | 7.7 | 800° C. | 1.2 |
| | 55 | | | | | | | | | | | 900° C. | 1.2 |
| | 56 | 26.1 | 11.4 | 3.5 | 0.0 | 0.0 | 41.0 | 30.3 | 91.5 | 8.5 | 7.7 | 800° C. | 0.6 |
| | 57 | | | | | | | | | | | 900° C. | 0.5 |
| | 58 | 218.2 | 146.7 | 38.8 | 0.0 | 0.0 | 403.7 | 40.2 | 90.4 | 9.6 | 9.4 | 800° C. | 12.5 |
| | 59 | | | | | | | | | | | 900° C. | 12.0 |
| | 60 | 88.9 | 61.2 | 16.5 | 0.0 | 0.0 | 166.6 | 40.8 | 90.1 | 9.9 | 9.5 | 800° C. | 4.7 |
| | 61 | | | | | | | | | | | 900° C. | 4.7 |
| | 62 | 35.8 | 23.1 | 6.3 | 0.0 | 0.0 | 65.2 | 39.3 | 90.3 | 9.7 | 9.2 | 800° C. | 1.0 |
| | 63 | | | | | | | | | | | 900° C. | 1.0 |
| | 64 | 20.6 | 15.0 | 4.0 | 0.0 | 0.0 | 39.6 | 42.1 | 90.0 | 10.0 | 9.7 | 800° C. | 0.5 |
| | 65 | | | | | | | | | | | 900° C. | 0.5 |

[Evaluation of Adhesion of Anti-Fouling Coating Film]

The surface of the uncoated glass ceramic substrate of Comparative Example 1 and the surface of the anti-fouling coating film of Examples 1 to 100 and Comparative Examples 2 to 65 were rubbed 20 times with a copper scrubbing brush by applying a load of 1 kg. Scratched films were evaluated as C (not available), and unscratched films were evaluated as A (good). Results are shown in Tables 13 to 17.

[Evaluation of Abrasion Resistance of Anti-Fouling Coating Film]

A non-woven fabric sponge containing abrasive particles made of resin was cut into squares having a side of 2 cm. A reciprocating abrasion test was performed on the surface of the uncoated glass ceramic substrate of Comparative Example 1 and the surface of the anti-fouling coating film of Examples 1 to 100 and Comparative Examples 2 to 65 using the cut sponge by applying a load of 600 g. Evaluation criteria are as follows. Results are shown in Tables 13 to 17.

A case in which 5 or more scratches can be confirmed by visual observation under a 3-wavelength light source, after 500 reciprocations: "C" (not available)

A case in which 5 or more scratches can be confirmed by visual observation under a 3-wavelength light source, after 1000 reciprocations: "B" (available)

A case in which 5 or more scratches can be confirmed by visual observation under a 3-wavelength light source, after 1500 reciprocations: "A" (good)

A case in which 5 or more scratches cannot be confirmed by visual observation, after 1500 reciprocations: "AA" (excellent)

[Evaluation of Cleanability]

Sugar and tomato ketchup were scorched on the uncoated glass ceramic substrate of Comparative Example 1 and the surface of the anti-fouling coating film of Examples 1 to 100 and Comparative Examples 2 to 65. Thereafter, the cleanability was evaluated. A procedure for evaluating the cleanability was as follows.

0.5 g of sugar and 1 g of tomato ketchup were separately attached to the surface of the test piece.

Next, a test piece to which the sugar and the tomato ketchup were attached was placed on a radiant cooking heater. An output of the heater was maintained for 15 minutes so that a surface temperature of the test piece was 350° C.±20° C., and the sugar and the tomato ketchup were scorched on the surface of the anti-fouling coating film.

Next, the test piece was cooled at a room temperature and then immersed in a water tank for 5 minutes.

Next, the test piece was taken out from the water tank, and then the test piece was dried at a room temperature.

Next, the non-woven fabric sponge containing abrasive particles made of resin was cut into squares having a side of 2 cm. The reciprocating wear test was performed on the scorched part of the surface of the test piece by using the cut sponge by applying a load of 600 g. Reciprocating friction was performed 25 times using the non-woven fabric sponge, and it was visually evaluated whether or not the scorched area remained more than 10% with respect to an area where the scorch was initially attached. In a case of exceeded, reciprocating frictions were further performed 100 times (after a total of 125 reciprocating frictions). After this, a remaining scorched area was visually evaluated. Evaluation criteria are as follows. Results are shown in Tables 13 to 17.

A case in which 90% or more of the scorched area with respect to the area where the scorch was initially attached can be removed by 25 times of reciprocating frictions: "AA" (excellent)

A case in which the scorched area remained more than 10% with respect to the area where the scorch was initially attached after the 25 times of reciprocating frictions, and 90% or more of the scorched area can be removed by total 125 times of reciprocating frictions: "A" (good)

A case in which 50% or more and less than 90% of the scorched area with respect to the area where the scorch was initially attached can be removed after 125 times of reciprocating frictions: "B" (available)

A case in which more than 50% of the area with respect to the scorched area where the scorch was initially attached remained after 125 times of reciprocating frictions: "C" (not available)

[Evaluation of Change in Appearance Due to Scorch]

After removing the scorched the tomato ketchup by the above evaluation of the cleanability, a change in an appearance of the uncoated glass ceramic substrate and the anti-fouling coating film of Examples 1 to 100 and Comparative Examples 2 to 65 were evaluated according to the following evaluation criteria. Results are shown in Tables 13 to 17.

A case in which the appearance of the anti-fouling coating film did not change at all: "A" (good)

A case in which the appearance of the anti-fouling coating film changed slightly: "B" (available)

A case in which the appearance of the anti-fouling coating film changed obviously: "C" (not available)

TABLE 13

|  |  | Coating method | Adhesion | Abrasion resistance | Scorch removal Sugar | Scorch removal Ketchup | change in film appearance after removing scorch |
|---|---|---|---|---|---|---|---|
| Example | 1 | Spray | A | AA | AA | AA | A |
|  | 2 | coating | A | AA | AA | AA | A |
|  | 3 |  | A | AA | AA | AA | A |
|  | 4 |  | A | AA | AA | AA | A |
|  | 5 |  | A | AA | AA | AA | A |
|  | 6 |  | A | A | A | A | A |
|  | 7 |  | A | A | A | A | A |
|  | 8 |  | A | B | A | B | A |
|  | 9 | Spray | A | AA | AA | AA | A |
|  | 10 | coating | A | AA | AA | AA | A |
|  | 11 |  | A | AA | AA | AA | A |
|  | 12 |  | A | AA | AA | AA | A |
|  | 13 |  | A | AA | AA | AA | A |
|  | 14 |  | A | A | A | A | A |
|  | 15 |  | A | A | A | A | A |
|  | 16 |  | A | B | A | B | A |
|  | 17 | Spray | A | AA | AA | AA | A |
|  | 18 | coating | A | AA | AA | AA | A |
|  | 19 |  | A | AA | AA | AA | A |
|  | 20 |  | A | AA | AA | AA | A |
|  | 21 |  | A | AA | AA | AA | A |
|  | 22 |  | A | A | A | A | A |
|  | 23 |  | A | A | A | A | A |
|  | 24 |  | A | B | A | B | A |
|  | 25 | Spray | A | AA | AA | AA | A |
|  | 26 | coating | A | AA | AA | AA | A |
|  | 27 |  | A | AA | AA | AA | A |
|  | 28 |  | A | AA | AA | AA | A |
|  | 29 |  | A | AA | AA | AA | A |
|  | 30 |  | A | A | A | A | A |
|  | 31 |  | A | A | A | A | A |
|  | 32 |  | A | B | A | B | A |

TABLE 14

|  |  | Coating method | Adhesion | Abrasion resistance | Scorch removal Sugar | Scorch removal Ketchup | change in film appearance after removing scorch |
|---|---|---|---|---|---|---|---|
| Example | 33 | Spray | A | AA | AA | AA | A |
|  | 34 | coating | A | AA | AA | AA | A |
|  | 35 |  | A | AA | AA | AA | A |
|  | 36 |  | A | AA | AA | AA | A |
|  | 37 |  | A | AA | AA | AA | A |
|  | 38 |  | A | A | A | A | A |
|  | 39 |  | A | A | A | A | A |
|  | 40 |  | A | B | A | B | A |
|  | 41 | Spray | A | AA | AA | AA | A |
|  | 42 | coating | A | AA | AA | AA | A |
|  | 43 |  | A | AA | AA | AA | A |
|  | 44 |  | A | AA | AA | AA | A |
|  | 45 |  | A | AA | AA | AA | A |
|  | 46 |  | A | A | A | A | A |
|  | 47 |  | A | A | A | A | A |
|  | 48 |  | A | B | A | B | A |
|  | 49 | Spray | A | AA | AA | AA | A |
|  | 50 | coating | A | AA | AA | AA | A |
|  | 51 |  | A | AA | AA | AA | A |
|  | 52 |  | A | AA | AA | AA | A |
|  | 53 |  | A | AA | AA | AA | A |
|  | 54 |  | A | A | A | A | A |
|  | 55 |  | A | A | A | A | A |
|  | 56 |  | A | B | A | B | A |
|  | 57 | Screen | A | AA | AA | AA | A |
|  | 58 | printing | A | AA | AA | AA | A |
|  | 59 | Screen | A | AA | AA | AA | A |
|  | 60 | printing | A | AA | AA | AA | A |
|  | 61 | Screen | A | AA | AA | AA | A |
|  | 62 | printing | A | AA | AA | AA | A |
|  | 63 | Screen | A | AA | AA | AA | A |
|  | 64 | printing | A | AA | AA | AA | A |

TABLE 15

|  |  | Coating method | Adhesion | Abrasion resistance | Scorch removal Sugar | Scorch removal Ketchup | change in film appearance after removing scorch |
|---|---|---|---|---|---|---|---|
| Example | 65 | Screen | A | AA | AA | AA | A |
|  | 66 | printing | A | AA | AA | AA | A |
|  | 67 | Screen | A | A | A | A | A |
|  | 68 | printing | A | B | A | B | A |
|  | 69 |  | A | AA | AA | AA | A |
|  | 70 |  | A | A | A | A | A |
|  | 71 |  | A | AA | AA | AA | A |
|  | 72 |  | A | AA | AA | AA | A |
|  | 73 | Screen | A | AA | AA | AA | A |
|  | 74 | printing | A | AA | AA | AA | A |
|  | 75 |  | A | AA | AA | AA | A |
|  | 76 |  | A | AA | AA | AA | A |
|  | 77 |  | A | AA | AA | AA | A |
|  | 78 |  | A | AA | AA | AA | A |
|  | 79 | Screen | A | AA | AA | AA | A |
|  | 80 | printing | A | AA | AA | AA | A |
|  | 81 |  | A | AA | AA | AA | A |
|  | 82 |  | A | AA | AA | AA | A |
|  | 83 |  | A | AA | AA | AA | A |
|  | 84 |  | A | AA | AA | AA | A |
|  | 85 | Screen | A | AA | AA | AA | A |
|  | 86 | printing | A | AA | AA | AA | A |
|  | 87 |  | A | AA | AA | AA | A |
|  | 88 |  | A | AA | AA | AA | A |
|  | 89 |  | A | AA | AA | AA | A |

TABLE 15-continued

| | Coating method | Adhesion | Abrasion resistance | Scorch removal Sugar | Scorch removal Ketchup | change in film appearance after removing scorch |
|---|---|---|---|---|---|---|
| 90 | | A | AA | AA | AA | A |
| 91 | Screen | A | AA | AA | AA | A |
| 92 | printing | A | AA | AA | AA | A |
| 93 | Screen | A | AA | AA | AA | A |
| 94 | printing | A | AA | AA | AA | A |
| 95 | | A | AA | AA | AA | A |
| 96 | | A | AA | AA | AA | A |
| 97 | | A | AA | AA | AA | A |
| 98 | | A | AA | AA | AA | A |
| 99 | Screen | A | AA | AA | AA | A |
| 100 | printing | A | AA | AA | AA | A |

TABLE 16

| | | Coating method | Adhesion | Abrasion resistance | Scorch removal Sugar | Scorch removal Ketchup | change in film appearance after removing scorch |
|---|---|---|---|---|---|---|---|
| Comparative Example | 1 | Uncoated glass ceramic substrate | — | A | C | C | A |
| | 2 | Spray | A | B | AA | AA | A |
| | 3 | coating | A | B | AA | AA | A |
| | 4 | | A | B | AA | AA | A |
| | 5 | | A | B | AA | AA | A |
| | 6 | | A | B | AA | AA | A |
| | 7 | | A | B | A | A | A |
| | 8 | | A | B | A | A | A |
| | 9 | | A | C | A | B | A |
| | 10 | Spray | A | AA | B | B | B |
| | 11 | coating | A | AA | B | B | B |
| | 12 | | A | AA | B | B | B |
| | 13 | | A | AA | B | B | B |
| | 14 | | A | AA | B | B | B |
| | 15 | | A | A | B | B | B |
| | 16 | | A | A | C | C | A |
| | 17 | | A | B | C | C | A |
| | 18 | Spray | C | Not evaluated due to poor adhesion | | | |
| | 19 | coating | C | | | | |
| | 20 | | C | | | | |
| | 21 | | C | | | | |
| | 22 | | C | | | | |
| | 23 | | C | | | | |
| | 24 | | C | | | | |
| | 25 | | C | | | | |
| | 26 | Spray | A | AA | A | A | C |
| | 27 | coating | A | AA | A | A | C |
| | 28 | | A | AA | A | A | C |
| | 29 | | A | AA | A | A | C |
| | 30 | | A | AA | B | A | B |
| | 31 | | A | A | B | B | B |
| | 32 | | A | A | B | A | A |
| | 33 | | A | B | C | B | A |

TABLE 17

| | | Coating method | Adhesion | Abrasion resistance | Scorch removal Sugar | Scorch removal Ketchup | change in film appearance after removing scorch |
|---|---|---|---|---|---|---|---|
| Comparative Example | 34 | Spray coating | A | AA | AA | AA | C |
| | 35 | | A | AA | AA | AA | C |
| | 36 | | A | AA | AA | AA | B |
| | 37 | | A | AA | A | AA | B |
| | 38 | | A | AA | A | A | B |
| | 39 | | A | A | A | A | B |
| | 40 | | A | A | A | B | A |
| | 41 | | A | B | B | B | A |
| | 42 | Spray coating | A | AA | B | A | A |
| | 43 | | A | AA | B | A | A |
| | 44 | | A | AA | B | A | A |
| | 45 | | A | AA | B | B | A |
| | 46 | | A | AA | C | B | A |
| | 47 | | A | A | C | B | A |
| | 48 | | A | A | C | C | A |
| | 49 | | A | B | C | C | A |
| | 50 | Spray coating | A | AA | B | A | A |
| | 51 | | A | AA | B | A | A |
| | 52 | | A | AA | B | A | A |
| | 53 | | A | AA | B | B | A |
| | 54 | | A | AA | B | B | A |
| | 55 | | A | A | C | B | A |
| | 56 | | A | A | C | B | A |
| | 57 | | A | B | C | C | A |
| | 58 | Spray coating | A | AA | B | A | A |
| | 59 | | A | AA | B | A | A |
| | 60 | | A | AA | B | A | A |
| | 61 | | A | AA | B | B | A |
| | 62 | | A | AA | B | B | A |
| | 63 | | A | A | B | B | A |
| | 64 | | A | A | C | B | A |
| | 65 | | A | B | C | C | A |

From the results of Tables 13 to 17, in all Examples, it was confirmed that the cleanability (scorch removal) was improved regardless of the adhesion amount of the anti-fouling coating film and the calcination temperature of the anti-fouling coating film, as compared with the uncoated glass ceramic substrate on which the anti-fouling coating film was not formed as in Comparative Example 1.

From the results of Tables 13 to 17, it was found that the following results were obtained by comparing Example 1 to Example 8 with Comparative Examples 34 to 41. That is, in a case where the proportion of the mass converted as the lanthanum oxide to the total mass converted as the zirconium oxide and the lanthanum oxide was set as X %, it was confirmed that in a case where the X was less than 20%, the cleanability deteriorated. In addition, in a case where the X is less than 20%, the chemical durability of the anti-fouling coating film (durability against an acid or an alkali) deteriorated. In addition, it was confirmed that in the anti-fouling coating film having the ΔR of 1% or more, the change in the appearance of the anti-fouling coating film after removing the scorch of tomato ketchup was large.

From the results of Tables 13 to 17, it was found that the following results were obtained by comparing Example 25 to Example 32 with Comparative Examples 18 to 25. That is, it was confirmed that in a case where the mass converted as the lanthanum oxide with respect to the total mass converted as the zirconium oxide and the lanthanum oxide exceeded 50%, the adhesion of the anti-fouling coating film to the glass ceramic substrate deteriorated.

From the results of Tables 13 to 17, it was found that the following results were obtained by comparing Example 33 to Example 40 with Comparative Examples 2 to 9. That is, it was confirmed that in a case where the masses converted as oxides of the silicon, the phosphorus, or the boron with respect to the mass of the anti-fouling coating film were less than 5%, the abrasion resistance of the anti-fouling coating film deteriorated.

From the results of Tables 13 to 17, it was found that the following results were obtained by comparing Example 1 to Example 24 with Comparative Examples 42 to 65. That is, it was confirmed that the proportion of the total mass converted as oxides of the silicon, the phosphorus, and boron to the total mass converted as the zirconium oxide and the lanthanum oxide exceeded [6+(X−20)/6]%, the cleanability of the anti-fouling coating film deteriorated. In addition, in a case where the proportion of the mass converted as the lanthanum oxide to the total masses converted as the zirconium oxide and the lanthanum oxide was set as X %, in a case where the total mass converted as the oxides of the silicon, the phosphorus, and the boron exceeded [6+(X−20)/6]%, the chemical durability (durability against an acid or an alkali) of the anti-fouling coating film also deteriorated. Therefore, it was confirmed that in the anti-fouling coating film having the ΔR of 1% or more, the change in the appearance of the anti-fouling coating film after removing the scorch of tomato ketchup was large.

From the results of Tables 13 to 17, it was found that the following results were obtained by comparing Example 25 to Example 32 with Comparative Examples 10 to 17. That is, it was confirmed that the total masses converted as the zirconium oxide and the lanthanum oxide was less than 90% with respect to the mass of the anti-fouling coating film (the mass obtained by adding the mass converted as the oxide of the component (c) to the total mass, the cleanability deteriorated. Also, in a case where the total mass converted as the zirconium oxide and the lanthanum oxide was less than 90% with respect to the mass of the anti-fouling coating film, the chemical durability of the anti-fouling coating film also deteriorated. Therefore, it was confirmed that in the anti-fouling coating film having the ΔR of 1% or more, the change in the appearance of the anti-fouling coating film after removing the scorch of tomato ketchup was large.

INDUSTRIAL APPLICABILITY

There is provided an anti-fouling coating film, a glass ceramic product, a coating material for forming an anti-fouling coating film, and a method for producing a glass ceramic product, by which it is easy to clean scorched contaminants containing a sugar, durability against erosion of an acid or an alkali contained in contaminants can be improved, and a mechanical strength such as abrasion resistance and the like can be improved without impairing a cleanability and a chemical durability.

What is claimed is:

1. An anti-fouling coating film comprising:
    a component (A): zirconium;
    a component (B): lanthanum; and
    a component (C): at least one selected from a group consisting of silicon, phosphorus, and boron,
    wherein in a case where masses of the component (A), the component (B), and the component (C) are used by being converted into masses of oxides thereof, a proportion of a total mass of the component (A) and the component (B) to a mass of the anti-fouling coating film is 90% or more and 95% or less, and
    in a case where a proportion X is defined by a formula, X=mass of component (B)/(total mass of component (A)+component (B))×100, X is 20% or more and 50% or less, and a proportion of the mass of the component (C) to the mass of the anti-fouling coating film is 5% or more and [6+(X−20)/6]% or less.

2. A glass ceramic product comprising:
    a substrate formed of a glass-ceramic; and
    the anti-fouling coating film according to claim 1 formed on a surface of the substrate.

3. The glass ceramic product according to claim 2,
    wherein a difference ($R_1$−$R_2$) between a visual reflectance $R_1$% of a surface of the anti-fouling coating film and a visual reflectance $R_2$% of a surface of the substrate is 1% or more.

4. A coating material for forming an anti-fouling coating film comprising:
    a component (a): at least one selected from a group consisting of a zirconium oxide, a zirconium ion, and a zirconium oxide precursor;
    a component (b): at least one selected from a group consisting of a lanthanum oxide, a lanthanum ion, and a lanthanum oxide precursor;
    a component (c): at least one selected from a group consisting of an oxide, an ion, and an oxide precursor of at least one of silicon, phosphorus, and boron; and
    a dispersion medium,
    wherein in a case where masses of the component (A), the component (B), and the component (C) are used by being converted into masses of oxides thereof, a proportion of a total mass of the component (a) and the component (b) to a mass of a total solid content of the coating material is 90% or more and 95% or less, and
    in a case where a proportion X is defined by a formula, X=mass of component (B)/(total mass of component (A)+component (B))×100, X is 20% or more and 50% or less, and a proportion of the mass of the component (c) to the mass of the total solid content is 5% or more and [6+(X−20)/6]% or less.

5. A method for producing a glass ceramic product comprising:
    a step of applying a coating material for forming an anti-fouling coating film according to claim 4 onto a surface of a substrate formed of a glass-ceramic to form a coating film; and
    a step of heat-treating the coating film at a temperature of 650° C. or higher and 950° C. or lower to form an anti-fouling coating film on the surface of the substrate.

* * * * *